(12) United States Patent
Ge et al.

(10) Patent No.: US 12,003,340 B2
(45) Date of Patent: Jun. 4, 2024

(54) METHOD FOR SENDING HYBRID AUTOMATIC REPEAT REQUEST ACKNOWLEDGMENT INFORMATION, METHOD FOR RECEIVING HYBRID AUTOMATIC REPEAT REQUEST ACKNOWLEDGMENT INFORMATION, AND COMMUNICATIONS APPARATUS

(71) Applicant: Huawei Technologies Co., Ltd., Shenzhen (CN)

(72) Inventors: Shibin Ge, Shanghai (CN); Haicun Hang, Shanghai (CN); Xiaohan Wang, Shanghai (CN); Liuliu Ji, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 633 days.

(21) Appl. No.: 17/189,823

(22) Filed: Mar. 2, 2021

(65) Prior Publication Data

US 2021/0184803 A1 Jun. 17, 2021

Related U.S. Application Data

(63) Continuation of application No. PCT/CN2019/103084, filed on Aug. 28, 2019.

(30) Foreign Application Priority Data

Sep. 3, 2018 (CN) .......................... 201811018348.8

(51) Int. Cl.
H04W 4/00 (2018.01)
H04L 1/1867 (2023.01)
H04L 5/00 (2006.01)

(52) U.S. Cl.
CPC .......... H04L 1/1887 (2013.01); H04L 5/0055 (2013.01)

(58) Field of Classification Search
CPC ... H04L 28/04; H04W 72/04; H04W 72/042; H04W 88/08; H04W 28/08;
(Continued)

(56) References Cited

U.S. PATENT DOCUMENTS 10,277,363 B2 * 4/2019 Cheng .................. H04L 5/1469
10,602,497 B2 * 3/2020 Chen ..................... H04L 1/1854
(Continued)

FOREIGN PATENT DOCUMENTS

CN 101841398 A 9/2010
CN 102972064 A 3/2013
(Continued)

OTHER PUBLICATIONS

Nokia et al., "On remaining aspects of NR CA/DC", 3GPP TSG-RAN WG1 Meeting NR#91, R1-1720512, Reno, NV, US, Nov. 27-Dec. 1, 2017, 11 pages.
(Continued)

Primary Examiner — Phuongchau Ba Nguyen
(74) Attorney, Agent, or Firm — Slater Matsil, LLP

(57) ABSTRACT

A terminal device generates at least two pieces of HARQ-ACK information based on a plurality of received PDSCHs, and sends the at least two pieces of HARQ-ACK information to a network device. Each piece of HARQ-ACK information includes an ACK or a NACK fed back for one or more PDSCHs. When a piece of HARQ-ACK information includes ACKs or NACKs fed back for a plurality of PDSCHs, at least one of the following of the plurality of PDSCHs corresponding to the HARQ-ACK information is the same: port groups to which ports of DMRSs used to demodulate the PDSCHs belong, identifiers of enabled
(Continued)

transport blocks carried in the plurality of PDSCHs, and PDCCH configurations of a plurality of PDCCHs used to schedule the plurality of PDSCHs.

20 Claims, 4 Drawing Sheets

(58) Field of Classification Search
CPC ... H04W 28/084; H04W 36/22; H04W 72/12; H04L 5/0007; H04L 1/1887; H04L 5/0055; H04L 1/1861; H04L 5/0035; H04B 7/0695; H04B 7/088
See application file for complete search history.

(56) References Cited

U.S. PATENT DOCUMENTS

| | | | |
|---|---|---|---|
| 10,673,573 B2 * | 6/2020 | Wang | H04L 1/1896 |
| 10,735,146 B2 * | 8/2020 | Wang | H04L 1/1854 |
| 10,855,430 B2 * | 12/2020 | Lee | H04L 1/1896 |
| 2011/0199986 A1 | 8/2011 | Fong et al. | |
| 2014/0044092 A1 * | 2/2014 | Guan | H04W 72/23 370/330 |
| 2016/0065345 A1 | 3/2016 | Kim et al. | |
| 2016/0204906 A1 * | 7/2016 | Cheng | H04L 1/1861 370/280 |
| 2018/0270022 A1 * | 9/2018 | Sun | H04L 1/0061 |
| 2019/0363840 A1 * | 11/2019 | Wang | H04L 1/1896 |
| 2020/0374048 A1 * | 11/2020 | Lei | H04L 1/1896 |
| 2021/0184803 A1 * | 6/2021 | Ge | H04L 1/1861 |

FOREIGN PATENT DOCUMENTS

| | | |
|---|---|---|
| CN | 103609188 A | 2/2014 |
| CN | 105122676 A | 12/2015 |
| CN | 105262574 A | 1/2016 |
| CN | 107708215 A | 2/2018 |
| CN | 107733558 A | 2/2018 |
| CN | 108111272 A | 6/2018 |
| CN | 108141322 A | 6/2018 |
| WO | 2013055128 A2 | 4/2013 |
| WO | 2013185297 A1 | 12/2013 |
| WO | 2017192793 A1 | 11/2017 |
| WO | 2018131880 A1 | 7/2018 |
| WO | 2018141246 A1 | 8/2018 |

OTHER PUBLICATIONS

Samsung, "HARQ-ACK Feedback for CBG-Based Retransmissions", 3GPP TSG RAN WG1 Meeting #90, R1-1713643, Prague, Czechia, Aug. 21-25, 2017, 5 pages.

Huawei, et al., "Remaining issues for HARQ-ACK feedback on Pucch" 3GPP TSG RAN WG1 Meeting #76b, R1-141584, Shenzhen, China, Mar. 31-Apr. 4, 2014, 4 pages.

* cited by examiner

METHOD FOR SENDING HYBRID AUTOMATIC REPEAT REQUEST ACKNOWLEDGMENT INFORMATION, METHOD FOR RECEIVING HYBRID AUTOMATIC REPEAT REQUEST ACKNOWLEDGMENT INFORMATION, AND COMMUNICATIONS APPARATUS

CROSS-REFERENCE TO RELATED APPLICATIONS

This application is a continuation of International Application No. PCT/CN2019/103084, filed on Aug. 28, 2019, which claims priority to Chinese Patent Application No. 201811018348.8, filed on Sep. 3, 2018. The disclosures of the aforementioned applications are hereby incorporated by reference in their entireties.

TECHNICAL FIELD

This application relates to the wireless communications field, and more specifically, to a method for sending hybrid automatic repeat request acknowledgment information, a method for receiving hybrid automatic repeat request acknowledgment information, and a communications apparatus.

BACKGROUND

Coordinated multipoint (CoMP) transmission is a method used to resolve an inter-cell interference problem and increase a throughput of a cell edge user. In downlink transmission, a network device, for example, a transmission and reception point (TRP), may schedule a physical downlink shared channel (PDSCH) for a terminal device by using downlink control information (DCI). The terminal device may feed back hybrid automatic repeat request (HARQ)-acknowledgement (ACK) information to the site by using an uplink resource that is scheduled for the terminal device by using the same DCI, to feed back whether the PDSCH is successfully received.

However, in some scenarios, for example, in a non-ideal backhaul scenario, due to a relatively large communication delay between sites, a multi-site scheduling solution based on a plurality of pieces of DCI is proposed. In the multi-site scheduling solution, two or more network devices are supported in separately scheduling respective PDSCHs for the terminal device by using DCI respectively sent by the two or more network devices, to transmit data.

Therefore, how to feed back HARQ-ACK information for each PDSCH in the foregoing multi-site scheduling case becomes a technical problem to be urgently resolved.

SUMMARY

This application provides a method for sending HARQ-ACK information, a method for receiving HARQ-ACK information, and a communications apparatus, to accurately feed back feedback information of PDSCHs from different sites during multi-site scheduling.

According to a first aspect, a method for sending HARQ-ACK information is provided. The method may be performed by a terminal device, or may be performed by a chip disposed in the terminal device. This is not limited in this application.

The method includes: generating at least two pieces of HARQ-ACK information based on a plurality of received PDSCHs, and sending the at least two pieces of HARQ-ACK information. Each piece of HARQ-ACK information includes an ACK or a negative acknowledgment (NACK) fed back for one or more PDSCHs. When the HARQ-ACK information includes ACKs or NACKs fed back for a plurality of PDSCHs, at least one of the following of the plurality of PDSCHs corresponding to the HARQ-ACK information is the same: port groups to which ports of demodulation reference signals (DMRS) used to demodulate the plurality of PDSCHs belong, identifiers of enabled transport blocks (TB) carried in the plurality of PDSCHs, and PDCCH configurations (PDCCH config) of a plurality of physical downlink control channels (PDCCH) used to schedule the plurality of PDSCHs.

In other words, a plurality of PDSCHs corresponding to a same piece of HARQ-ACK information have a same attribute, and the same attribute includes at least one of the following: ports used to demodulate DMRSs of the plurality of PDSCHs belong to a same port group; identifiers of enabled TBs carried in the plurality of PDSCHs are the same; and PDCCH configurations of PDCCHs used to schedule the PDSCHs are the same.

In another implementation, the plurality of PDSCHs belong to at least two PDSCH groups, each PDSCH group includes one or more PDSCHs, and each piece of HARQ-ACK information includes an ACK or a NACK fed back for each PDSCH in one PDSCH group. When the PDSCH group includes a plurality of PDSCHs, the plurality of PDSCHs in the PDSCH group have at least one of the foregoing same attributes.

The terminal device may feed back an ACK or a NACK for each PDSCH in a corresponding PDSCH group in the HARQ-ACK information. When an ACK is fed back for a PDSCH, it indicates that the terminal device successfully receives the PDSCH and successfully decodes the PDSCH. When a NACK is fed back for a PDSCH, it indicates that the terminal device fails to receive the PDSCH successfully, or fails to decode the PDSCH successfully. In this embodiment of this application, for ease of description, an ACK or a NACK fed back for a PDSCH in the HARQ-ACK information is collectively referred to as feedback information for the PDSCH.

Based on the foregoing technical solution, the terminal device may determine, based on at least one of the DMRS port group, the identifier of the enabled TB, and the PDCCH configuration, which PDSCHs may be received from a same network device, so that the terminal device can determine which PDSCHs may feed back an ACK or a NACK by using a same piece of HARQ-ACK information. If the terminal device cannot learn which PDSCHs are from a same network device, feedback information of PDSCHs from different network devices may be placed in a same piece of HARQ-ACK information, and consequently, feedback information obtained by a network device may be incorrect. If the network device cannot accurately learn of a receiving or decoding status of each PDSCH, the network device cannot make a proper decision, for example, whether the PDSCH needs to be retransmitted. However, in this embodiment of this application, the terminal device may determine, based on the foregoing listed attributes, which PDSCHs may be received from a same network device, thereby avoiding incorrect feedback that may be caused when feedback information of PDSCHs from different network devices is placed in a same piece of HARQ-ACK information. In this way, receiving and decoding statuses of each PDSCH can be accurately fed back in a case of multi-site scheduling. The network device may determine, based on feedback information for each PDSCH, which PDSCHs need to be retransmitted and which PDSCHs do not need to be retransmitted, thereby helping improve data transmission performance and improve user experience.

With reference to the first aspect, in some implementations of the first aspect, ports of PDSCHs corresponding to a same piece of HARQ-ACK information belong to a same port group. The generating at least two pieces of HARQ-ACK information based on a plurality of received PDSCHs includes: generating at least two pieces of HARQ-ACK information based on the plurality of received PDSCHs and a port group to which a port of each PDSCH belongs. A port of the PDSCH is a port used to demodulate a DMRS of the PDSCH. Ports of all PDSCHs corresponding to each piece of HARQ-ACK information belong to a same port group.

To be specific, the terminal device may determine, based on a port group to which a port of each PDSCH belongs, feedback information belonging to which PDSCHs may be placed in a same piece of HARQ-ACK information.

With reference to the first aspect, in some implementations of the first aspect, identifiers of enabled TBs of PDSCHs corresponding to a same piece of HARQ-ACK information are the same. The generating at least two pieces of HARQ-ACK information based on a plurality of received PDSCHs includes: generating at least two pieces of HARQ-ACK information based on the plurality of received PDSCHs and an identifier of an enabled TB carried in each PDSCH. Identifiers of enabled TBs carried in PDSCHs corresponding to each piece of HARQ-ACK information are the same.

To be specific, the terminal device may determine, based on an identifier of an enabled TB carried in each PDSCH, feedback information belonging to which PDSCHs may be placed in a same piece of HARQ-ACK information.

With reference to the first aspect, in some implementations of the first aspect, PDCCH configurations for scheduling PDCCHs of PDSCHs corresponding to a same piece of HARQ-ACK information are different. The generating at least two pieces of HARQ-ACK information based on a plurality of received PDSCHs includes: generating at least two pieces of HARQ-ACK information based on the plurality of received PDSCHs and PDCCH configurations of a plurality of PDCCHs used to schedule the plurality of PDSCHs. Each PDSCH corresponding to each piece of HARQ-ACK information is scheduled by a PDCCH detected based on a same PDCCH configuration. To be specific, the terminal device may determine, based on a PDCCH configuration on which blind detection of the PDCCH is based, feedback information belonging to which PDSCHs in PDSCHs scheduled by each PDCCH may be placed in a same piece of HARQ-ACK information.

A scheduling PDCCH of a PDSCH is a PDCCH used to schedule the PDSCH. Each PDCCH schedules a PDSCH by using DCI carried in the PDCCH. Therefore, PDCCH configurations of scheduling DCI of PDSCHs corresponding to a same piece of HARQ-ACK information are also the same.

With reference to the first aspect, in some implementations of the first aspect, types of scheduling DCI of PDSCHs corresponding to a same piece of HARQ-ACK information are the same. The generating at least two pieces of HARQ-ACK information based on a plurality of received PDSCHs includes: generating at least two pieces of HARQ-ACK information based on the plurality of received PDSCHs and types of a plurality of DCI used to schedule the plurality of PDSCHs. PDSCHs corresponding to each piece of HARQ-ACK information are scheduled by a same type of DCI.

DCI may be classified into primary DCI and secondary DCI, or first-level DCI and second-level DCI based on different content included. DCI may be classified into fast DCI and slow DCI based on frequency of occurrence of DCI. In addition, the DCI may be further distinguished based on different DCI formats or different configurations in a same DCI format.

Because the DCI may be carried in the PDCCH and sent to the terminal device, a DCI type may also be extended to a PDCCH type. In other words, types of scheduling PDCCHs of PDSCHs corresponding to a same piece of HARQ-ACK information are the same.

With reference to the first aspect, in some implementations of the first aspect, the plurality of PDSCHs are scheduled by a plurality of PDCCHs, the plurality of PDCCHs belong to at least two PDCCH groups, and each PDCCH group may be used to schedule one PDSCH group. In other words, DCI in the plurality of PDCCHs belongs to at least two DCI groups, and each DCI group may be used to schedule one PDSCH group. Each PDSCH group corresponds to one piece of HARQ-ACK information. In other words, each PDCCH group may correspond to one piece of HARQ-ACK information, or each DCI group may correspond to one piece of HARQ-ACK information.

Specifically, each piece of HARQ-ACK information includes an ACK or a NACK fed back for each PDSCH scheduled by one PDCCH group. When a PDCCH group includes a plurality of PDCCHs, the plurality of PDCCHs in the PDCCH group have at least one same attribute of the following: antenna ports indicated by DCI carried in the plurality of PDCCHs in the PDCCH group belong to a same port group; identifiers of enabled TBs indicated by DCI carried in the plurality of PDCCHs in the PDCCH group are the same; and PDCCH configurations used to schedule the plurality of PDCCHs in the PDCCH group are the same.

Optionally, the method further includes: The terminal device determines a transmission resource of corresponding HARQ-ACK information based on a last received PDCCH in each PDCCH group.

Specifically, the network device may indicate an uplink resource by using DCI in a PDCCH, and the uplink resource is an uplink resource used to transmit feedback information of a PDSCH scheduled by using the DCI. The terminal device may determine, based on an uplink resource indicated in last received DCI in each DCI group, the uplink resource as a transmission resource used to transmit HARQ-ACK information corresponding to a DCI group to which the DCI belongs.

Optionally, the method further includes: The terminal device determines a length of corresponding HARQ-ACK information based on a last received PDCCH in each PDCCH group.

Specifically, when the network device serves the terminal device by using a CoMP technology, a DAI field of DCI in a PDCCH may be used to indicate a sequence number of a scheduled PDSCH. The terminal device may determine a total quantity of scheduled PDSCHs based on a DAI field in last received DCI, and further determine a length of HARQ-ACK information. The DAI may be a counter DAI.

When the network device serves the terminal device by using a carrier aggregation (CA) technology, a dual connectivity (DC) technology, or a multi-connectivity technology, the network device may indicate, by using a DAI field of DCI in a PDCCH, a sequence number of a scheduled PDSCH and a total quantity of currently scheduled PDSCHs. The DAI field includes a counter DAI and a total DAI. The counter DAI may be used to indicate a sequence number of a scheduled PDSCH. The total DAI may be used to indicate a total quantity of currently scheduled PDSCHs. The terminal device may determine the total quantity of scheduled PDSCHs based on the total DAI in the DAI field in the last received DCI, to further determine the length of the HARQ-ACK information. Optionally, the method further includes: The terminal device determines a location of feedback information of a scheduled PDSCH in corresponding HARQ-ACK information based on a DAI field in DCI carried in each PDCCH.

Specifically, the terminal device may determine the location of the feedback information of the scheduled PDSCH in the corresponding HARQ-ACK information based on a counter DAI in the DCI carried in the PDCCH.

According to a second aspect, a method for receiving HARQ-ACK information is provided. The method may be performed by a network device, or may be performed by a chip disposed in a network device.

The method includes: receiving one or more pieces of HARQ-ACK information, where each piece of HARQ-ACK information includes an ACK or a NACK fed back for one or more PDSCHs, and when one piece of HARQ-ACK information includes ACKs or NACKs fed back for a plurality of PDSCHs, at least one of the following of the plurality of PDSCHs corresponding to the HARQ-ACK information is the same: port groups to which ports used to demodulate demodulation reference signals DMRSs of the plurality of PDSCHs belong, identifiers of enabled transport blocks TBs carried in the plurality of PDSCHs, and PDCCH configurations of a plurality of physical downlink control channels PDCCHs used to schedule the plurality of PDSCHs; and determining, based on the one or more pieces of HARQ-ACK information, a PDSCH that needs to be retransmitted.

In other words, a plurality of PDSCHs corresponding to a same piece of HARQ-ACK information have a same attribute, and the same attribute includes at least one of the following: ports used to demodulate DMRSs of the plurality of PDSCHs belong to a same port group; identifiers of enabled TBs carried in the plurality of PDSCHs are the same; and PDCCH configurations of PDCCHs used to schedule the PDSCHs are the same.

In another implementation, the plurality of PDSCHs belong to at least two PDSCH groups, each PDSCH group includes one or more PDSCHs, and each piece of HARQ-ACK information includes an ACK or a NACK fed back for each PDSCH in one PDSCH group. When the PDSCH group includes a plurality of PDSCHs, the plurality of PDSCHs in the PDSCH group have at least one of the foregoing same attributes.

Based on the foregoing technical solution, a terminal device may determine, based on at least one of the DMRS port group, the identifier of the enabled TB, and the PDCCH configuration, which PDSCHs may be received from a same network device, so that the terminal device can determine which PDSCHs may feed back an ACK or a NACK by using a same piece of HARQ-ACK information. If the terminal device cannot learn which PDSCHs are from a same network device, feedback information of PDSCHs from different network devices may be placed in a same piece of HARQ-ACK information, and consequently, feedback information obtained by a network device may be incorrect. If the network device cannot accurately learn of a receiving status of each PDSCH, the network device cannot make a proper decision, for example, whether the PDSCH needs to be retransmitted. However, in this embodiment of this application, the terminal device may determine, based on the foregoing listed attributes, which PDSCHs may be received from a same network device, thereby avoiding incorrect feedback that may be caused when feedback information of PDSCHs from different network devices is placed in a same piece of HARQ-ACK information. In this way, receiving and decoding statuses of each PDSCH can be accurately fed back in a case of multi-site scheduling. The network device may determine, based on feedback information for each PDSCH, which PDSCHs need to be retransmitted and which PDSCHs do not need to be retransmitted, thereby helping improve data transmission performance and improve user experience.

With reference to the second aspect, in some implementations of the second aspect, the plurality of PDSCHs are scheduled by a plurality of PDCCHs, the plurality of PDCCHs belong to at least two PDCCH groups, and each PDCCH group may be used to schedule one PDSCH group. In other words, DCI in the plurality of PDCCHs belongs to at least two DCI groups, and each DCI group may be used to schedule one PDSCH group. Each PDSCH group corresponds to one piece of HARQ-ACK information. In other words, each PDCCH group may correspond to one piece of HARQ-ACK information, or each DCI group may correspond to one piece of HARQ-ACK information.

Optionally, the method further includes: The network device determines a transmission resource of corresponding HARQ-ACK information based on a last sent PDCCH in each PDCCH group.

Specifically, the network device may indicate an uplink resource by using DCI in a PDCCH, and the uplink resource is an uplink resource used to transmit feedback information of a PDSCH scheduled by using the DCI. The network device may determine, based on an uplink resource indicated in last sent DCI in each DCI group, the uplink resource as a transmission resource used to transmit HARQ-ACK information corresponding to a DCI group to which the DCI belongs. The network device may receive the HARQ-ACK information on the uplink resource.

Optionally, the method further includes: The network device determines a location of feedback information of a scheduled PDSCH in corresponding HARQ-ACK information based on each PDCCH.

Specifically, the network device may predetermine the location of the feedback information of the scheduled PDSCH in the corresponding HARQ-ACK information. For example, the location may be determined based on a sequential order of scheduled PDSCHs in time domain, or may be determined based on other information. This is not limited in this application.

With reference to the first aspect or the second aspect, in some possible implementations, transmission resources of the at least two pieces of HARQ-ACK information occupy a same time unit in time domain.

The time unit may be, for example, a slot, a subframe, a radio frame, a mini slot (mini slot or sub slot), a plurality of aggregated slots, or a plurality of aggregated subframes. This is not limited in this application.

In other words, the terminal device may send the at least two pieces of HARQ-ACK information on a same scheduled uplink resource. The at least two pieces of HARQ-ACK information may occupy a same orthogonal frequency division multiplexing (OFDM) symbol or different OFDM symbols. For ease of description, the OFDM symbol is referred to as a symbol for short below.

With reference to the first aspect or the second aspect, in some possible implementations, the transmission resources of the at least two pieces of HARQ-ACK information occupy different symbols in the same time unit.

Considering that different network devices may have different distances from the terminal device, the terminal device may perform independent power control on sending of different HARQ-ACK information in a time division manner. In this way, it can be ensured that receive power of each piece of HARQ-ACK information to the different network devices can meet a preset threshold, thereby helping improve information receiving quality.

According to a third aspect, a communications apparatus is provided, and includes modules or units configured to perform the method in any possible implementation of the first aspect.

According to a fourth aspect, a communications apparatus is provided, and includes a processor. The processor is coupled to a memory, and may be configured to execute an instruction in the memory, to implement the method in any possible implementation of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip disposed in a terminal device. When the communications apparatus is a chip disposed in a terminal device, the communications interface may be an input/output interface.

Optionally, the transceiver may be a transceiver circuit. Optionally, the input/output interface may be an input/output circuit.

According to a fifth aspect, a communications apparatus is provided, and includes modules or units configured to perform the method in any possible implementation of the second aspect.

According to a sixth aspect, a communications apparatus is provided, and includes a processor. The processor is coupled to a memory, and may be configured to execute an instruction in the memory, to implement the method in any possible implementation of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip disposed in a network device. When the communications apparatus is a chip disposed in a network device, the communications interface may be an input/output interface.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to receive a signal by using the input circuit, and transmit a signal by using the output circuit, so that the processor performs the method in any one of the first aspect, the second aspect, or the possible implementations of the first aspect or the second aspect.

In a specific implementation process, the processor may be a chip, an input circuit may be an input pin, an output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output, for example, but not limited to, to a transmitter and be transmitted by the transmitter, and the input circuit and the output circuit may be a same circuit, and the circuit serves as an input circuit and an output circuit at different moments. Specific implementations of the processor and various circuits are not limited in this embodiment of this application.

According to an eighth aspect, a processing apparatus is provided, and includes a processor and a memory. The processor is configured to read an instruction stored in the memory, receive a signal by using a receiver, and transmit a signal by using a transmitter, to perform the method in any one of the first aspect, the second aspect, or the possible implementations of the first aspect or the second aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be disposed on different chips. A type of the memory and a manner of disposing the memory and the processor are not limited in this embodiment of this application.

It should be understood that a related data exchange process, for example, sending indication information may be a process in which the processor outputs indication information, and receiving capability information may be a process in which the processor receives input capability information. Specifically, data that is output by the processor may be output to the transmitter, and input data received by the processor may come from the receiver. The transmitter and the receiver may be collectively referred to as a transceiver.

The processing apparatus in the eighth aspect may be a chip. The processor may be implemented by hardware or may be implemented by software. When implemented by hardware, the processor may be a logic circuit, an integrated circuit, or the like. When implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or an instruction). When the computer program is run, a computer is enabled to perform the method in any one of the first aspect, the second aspect, or the possible implementations of the first aspect or the second aspect.

According to a tenth aspect, a computer-readable medium is provided. The computer-readable medium stores a computer program (which may also be referred to as code or an instruction). When the computer program is run on a computer, the computer is enabled to perform the method in any one of the first aspect, the second aspect, or the possible implementations of the first aspect or the second aspect.

According to an eleventh aspect, a communications system is provided, and includes the foregoing network device and the foregoing terminal device.

DETAILED DESCRIPTION OF ILLUSTRATIVE EMBODIMENTS

Figure 1:
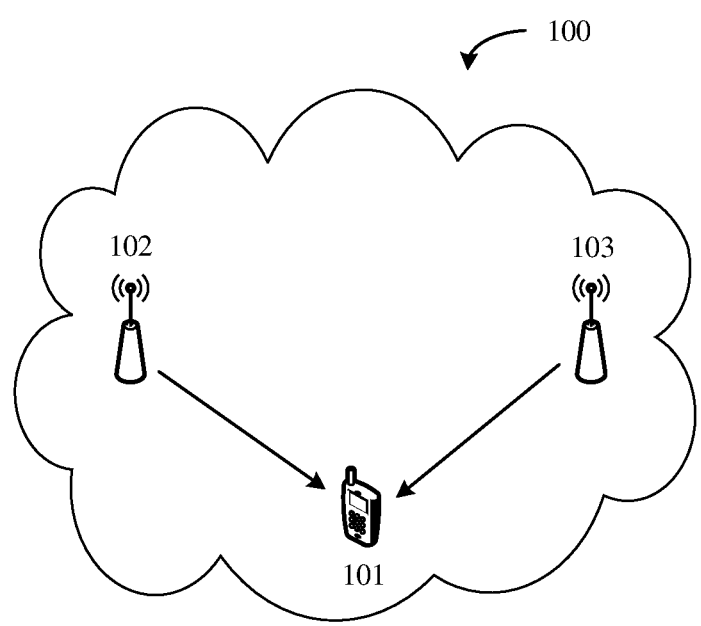
FIG. 1 is a schematic diagram of a communications system applicable to a method for sending HARQ-ACK information and a method for receiving HARQ-ACK information according to an embodiment of this application.

The following describes technical solutions of this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5th generation (5G) system or a new radio (NR) system.

It should be understood that a network device in the communications system may be any device having a radio transceiver function or a chip that can be disposed in the device. The device includes but is not limited to an evolved NodeB (eNB), a radio network controller (RNC), and a NodeB (NB), a base station controller (BSC), a base transceiver station (BTS), a home NodeB (for example, a Home evolved NodeB, or an HNB), a baseband unit (BBU), an access point (AP) in a wireless fidelity (WIFI) system, a wireless relay node, a wireless backhaul node, a transmission point (TP), a transmission and reception point (TRP), or the like, or may be a gNB or a transmission point (TRP or TP) in a 5G system such as an NR system, or an antenna panel or a group of antenna panels (including a plurality of antenna panels) of a base station in a 5G system, or may be a network node constituting a gNB or a transmission point, for example, a baseband unit (BBU) or a distributed unit (DU).

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical layer (PHY). Because information at the RRC layer finally changes to information at the PHY layer, or is converted from information at the PHY layer, in this architecture, higher layer signaling, such as RRC layer signaling or PDCP layer signaling, may also be considered to be sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

It should be further understood that the terminal device in the communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, or an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

For ease of understanding of the embodiments of this application, several terms used in this application are first briefly described.

1. HARQ-ACK information may also be referred to as HARQ information, and may be classified into downlink HARQ information and uplink HARQ information. In the current technology, downlink HARQ-ACK information may represent feedback information for downlink data (for example, a PDSCH), and may be, for example, an acknowledgment (ACK) or a negative acknowledgment (NACK). The uplink HARQ-ACK information may represent feedback information for uplink data (for example, a PUSCH), and similar to the downlink HARQ-ACK information, may be an ACK or a NACK. The ACK may indicate that data is successfully received and the data is successfully decoded. The NACK may indicate that data is not successfully received or that the data is not successfully decoded. A sending device (for example, a network device in downlink transmission or a terminal device in uplink transmission) may perform data retransmission based on a NACK fed back by a receiving device.

In a possible design, the HARQ-ACK information may be an information bit. When the information bit is set to "0", it may indicate a NACK, and when the information bit is set to "1", it may indicate an ACK. Alternatively, when the information bit is set to "1", it may indicate a NACK, and when the information bit is set to "0", it may indicate an ACK. This is not limited in this application.

The following describes the embodiments of this application by using sending and receiving of downlink HARQ-ACK information as an example, but this should not constitute any limitation on this application. This application does not exclude a possibility of applying a method provided in this application to a scenario of sending and receiving an uplink HARQ-ACK.

For example, the downlink HARQ-ACK information may be transmitted by using a physical uplink control channel (PUCCH), and may belong to one type of uplink control information (UCI). Downlink data for which HARQ-ACK information needs to be fed back may include, for example, a PDSCH having a corresponding physical downlink control channel (PDCCH), a semi-persistent scheduling (SPS) PDSCH, or a downlink SPS release, which may also be referred to as an SPS PDSCH release. In the embodiments of this application, a PDSCH having a corresponding PDCCH, that is, a PDSCH scheduled by a PDCCH is mainly described. Each PDCCH may be used to schedule one PDSCH, or may be used to schedule a plurality of PDSCHs. This is not limited in this application.

In the embodiments of this application, for ease of understanding, an example in which one PDCCH schedules one PDSCH is used to describe in detail a method for receiving HARQ-ACK information and a method for sending HARQ-ACK information. The downlink HARQ-ACK information may include feedback information for one or more PDSCHs. An ACK or a NACK may be fed back for each PDSCH by using one information bit. A specific implementation is not limited in this application.

2. A downlink assignment index (DAT) is a field in DCI. DAIs may be divided into two types: a counter DAI and a total DAI.

Counter DAI: When scheduling a PDSCH by using a PDCCH, a network device may add a DAI to DCI, to notify, by using the DAI, a terminal device of a sequence number of the current scheduling of the PDSCH. For example, if the scheduling is performed for the first time, the DAI may be "0", or if the scheduling is performed for the second time, the DAI may be "1", and so on. The counter DAI may be used to determine a location of feedback information of the currently scheduled PDSCH in HARQ-ACK information.

For example, in NR, the location of the feedback information of the currently scheduled PDSCH in the HARQ-ACK information may be determined based on the counter DAI. Specifically, the location may be determined by using the following formulas:

$\tilde{o}_{8j+2(V_{C\text{-}DAI}^{DL}, c, m-1)}$=HARQ-ACK information bits of a first transport block (transport block, TB) in a current cell, and $\tilde{o}_{8j+2(V_{C\text{-}DAI}^{DL}, c, m-1)+1}$=HARQ-ACK information bits of a second transport block in the current cell.

$V_{C\text{-}DAI}^{DL}$ represents a value corresponding to the counter DAI, c represents a serving cell index, m represents a monitoring occasion index of the PDCCH, j represents a quantity of cycles, and 8j represents a cyclic period of 8, that is, the quantity of cycles increases by 1 every eight TBs.

Total DAI: In a scenario such as carrier aggregation or dual connectivity, the network device may further notify, by using the DAI, the terminal device of a total quantity of currently scheduled PDSCHs. A total DAI in DCI received on a last blind detection occasion may be used to determine a length of the HARQ-ACK information, that is, a total quantity of bits of the HARQ-ACK information. For example, the length of the HARQ-ACK information may be a total quantity of currently scheduled PDSCHs indicated by the total DAI.

The DCI may carry only the counter DM, or may carry both the counter DAI and the total DAI. For example, in NR, if only one serving cell is configured, the DCI may carry only the counter DAI, and the DAI field may occupy two bits in the DCI. If a plurality of serving cells are configured, the DCI may carry both the counter DAI and the total DAI, and the DAI field may occupy four bits in the DCI, where two most significant bits (MSB) represent the counter DAI, and two least significant bits (LSB) represent the total DM.

3. An antenna port is referred to as a port for short, and may be understood as a transmit antenna identified by a receive end, or a transmit antenna that can be distinguished in space. One antenna port may be configured for each virtual antenna, and each virtual antenna may be a weighted combination of a plurality of physical antennas. In other words, there is no fixed mapping relationship between the antenna port and the physical antenna. Each antenna port may correspond to one reference signal. Therefore, each antenna port may also be referred to as a reference signal port, for example, a CSI-RS port or an SRS port.

In the embodiments of this application, the antenna port may be a DMRS port. DMRSs of different DMRS ports may occupy different time-frequency resources, or have different orthogonal cover codes. When the network device indicates a port to the terminal device, the terminal device may receive a DMRS based on the port indicated by the network device, and demodulate a PDCCH or a PDSCH based on the received DMRS.

4. A transport block is a data block from a higher layer. A transport block may include, for example, a data block of a media access control (MAC) protocol data unit (PDU). The data block may be transmitted in a time unit, or may be a unit of HARQ retransmission. In LTE and NR, for each terminal device, a maximum of two transport blocks can be sent in each time unit. By way of example and not limitation, the time unit is a transmission time interval (TTI).

When scheduling the PDSCH, the network device may indicate an enabled TB in the DCI. Usually, each piece of DCI includes configuration information of two TBs. Configuration information of each TB may include a modulation and coding scheme (MCS), a new data indicator (NDI), and a redundancy version (RV). When the DCI indicates that an MCS of a TB is 26 and an RV of the TB is 1, it may implicitly indicate that the TB is disabled. Otherwise, the TB is an enabled TB.

The configuration information of the two TBs may be distinguished by a sequence in which fields used to carry configuration information appear in the DCI. For example, in the configuration information of the two TBs, a field used to carry configuration information of a TB 1 is before a field used to carry configuration information of a TB 2. It should be understood that the sequence in which the fields used to carry the configuration information of the TBs appear in the DCI is merely a possible implementation. For example, the configuration information of the two TBs may be alternatively distinguished by using different indexes. This is not limited in this application. In an implementation of this application, information that can be used to distinguish a TB is referred to as an identifier of the TB. For example, the identifier of the TB may be a sequence in which a field used to carry configuration information of the TB appears in the DCI. A field that is used to carry the configuration information of the TB and that appears for the first time corresponds to the TB 1, and a field that is used to carry the configuration information of the TB and that appears for the second time corresponds to the TB 2.

5. A PDCCH configuration (PDCCH config) may be used to configure a PDCCH parameter, for example, a control resource set (CORESET), a search space, and other parameters that may be used to blindly detect a PDCCH. The PDCCH configuration may be configured, for example, by using a PDCCH configuration control element (PDCCH-config information element, PDCCH-config IE) in a higher-level parameter.

For example, in NR, the network device may configure a maximum of three control resource sets for each bandwidth part (BWP) in each cell in one PDCCH configuration. The network device may further configure a maximum of 10 search space sets for each BWP in each cell in one PDCCH configuration. Therefore, the terminal device can blindly detect the PDCCH based on a maximum of the three control resource sets and the 10 search space sets.

In the embodiments of this application, the PDCCH configuration may be used to determine the search space. Different PDCCH configurations determine different search spaces. Each PDCCH configuration may include one or more control resource sets and one or more search space sets. Each control resource set and each search space set may be further configured by using higher-level parameters. Therefore, one or more control resource sets and one or more search space sets may be determined based on one PDCCH configuration. In the embodiments of this application, different PDCCH configurations include different control resource sets, or different PDCCH configurations include different search space sets, or different PDCCH configurations include different control resource sets and different search space sets.

6. A control resource set is a resource set used to transmit downlink control information, and may also be referred to as a control resource area or a physical downlink control channel resource set.

Each control resource set may be a set of resource element groups (REG). An REG is a basic unit for allocating physical resources by using downlink control signaling, and is used to define a mapping of downlink control signaling to REs. For example, it is specified in an LTE protocol that one REG includes four consecutive non-reference signal (RS) resource elements (RE) in frequency domain. It should be understood that the REG is merely a unit used for resource allocation, and should not constitute any limitation on this application. This application does not exclude that a new resource allocation unit is defined in a future protocol to implement a same or similar function.

For the network device, the control resource set may be understood as a set of resources that may be used to send a PDCCH. For the terminal device, a resource corresponding to a search space of a PDCCH of each terminal device belongs to the control resource set. In other words, the network device may determine, from the control resource set, a resource to be used to send a PDCCH, and the terminal device may determine, based on the control resource set, a search space of the PDCCH.

The control resource set may include a time-frequency resource, for example, a bandwidth segment or one or more subbands in frequency domain, or one or more symbols in time domain. One control resource set may be consecutive or non-consecutive resource elements in time and frequency domain, for example, consecutive resource blocks (resource block, RB) or non-consecutive RBs.

It should be understood that specific content of the frequency domain resource, the time domain resource, and the time-frequency domain resource listed above are merely examples for description, and should not constitute any limitation on this application. For example, an RB is an example of a resource element, and a size of the RB may be a resource defined in an NR protocol, or may be a resource defined in a future protocol, or may be replaced with another name. For another example, the control resource set may alternatively be one or more slots, one or more radio frames, one or more subframes, one or more mini slots (mini slot or sub slot), or one or more transmission time intervals (TTI) in time domain. This is not particularly limited in the embodiments of this application.

For example, the control resource set may be configured by using a ControlResourceSet information element in a higher-level parameter. The higher-level parameter may include, for example, an identifier (ID) of a control resource set, a frequency domain resource, or a quantity of symbols included in duration. A specific parameter used to configure the control resource set is not limited in this application.

7. Search space set is a set of search spaces described from a perspective of a physical layer. For a higher layer, the search space set may also be referred to as a search space. In the embodiments of this application, for ease of distinguishing from a search space described below, the search space is referred to as a search space set in this application.

The network device may indicate the search space set by using a higher-level parameter. For example, the search space set may be configured by using a SearchSpaceSet information element in a higher-level parameter. The higher-level parameter may include, for example, an identifier of a search space set, an identifier of a control resource set, a monitoring slot period and offset, a monitoring symbol in a slot, and an aggregation level (AL). A specific parameter for configuring the search space is not limited in this application.

8. Blind detection occasion: When a search space set is configured by using a higher-level parameter SearchSpaceSet information element, a quantity of slots indicated by duration is a time length corresponding to a blind detection occasion in the search space set.

9. A search space may be jointly determined by the control resource set and the search space set. The search space may be a search range for blind detection by the terminal device, or a set of candidate downlink control channels that the terminal device needs to monitor. The search space may include a common search space and a UE-specific search space. The common search space is used to transmit cell-level common information, and the information may include, for example, control information related to paging, a random access response (RAR), a broadcast control channel (BCCH), or the like. The UE-specific search space is used to transmit terminal device (or UE)-level information, and the information may include, for example, control information related to a downlink shared channel (DL-SCH), an uplink shared channel (UL-SCH), or the like.

In the embodiments of this application, the terminal device may determine, based on both a control resource set and a search space configured in a PDCCH configuration, a time-frequency resource for blindly detecting a PDCCH.

10. A cell is also referred to as a serving cell, and is described by a higher layer from a perspective of resource management, mobility management, or a service unit. Coverage of each network device may be divided into one or more serving cells, and the serving cell may be considered as including a specific frequency domain resource. In the embodiments of this application, a cell may be replaced with a serving cell or a component carrier (CC, or referred to as a carrier, or the like). In the embodiments of this application, "cell", "serving cell", and "CC" are alternately used. When a difference is not emphasized, meanings of the "cell", "serving cell", and "CC" are the same.

It should be noted that the cell may be an area within coverage of a wireless network of the network device. In the embodiments of this application, different cells may correspond to different network devices. For example, a network device in a cell #1 and a network device in a cell #2 may be different network devices, for example, base stations. In other words, the cell #1 and the cell #2 may be managed by different base stations. In this case, the cell #1 and the cell #2 may be referred to as being co-site, or in a same base station. The network device in the cell #1 and the network device in the cell #2 may also be different radio frequency processing units of a same base station, for example, radio remote units (RRU). In other words, the cell #1 and the cell #2 may be managed by a same base station and have a same baseband processing unit and a same intermediate frequency processing unit, but have different radio frequency processing units. This is not particularly limited in this application.

11. Carrier aggregation: To efficiently use fragmented spectrums, a system supports aggregation of different component carriers. A technology that aggregates two or more carriers to support a larger transmission bandwidth may be referred to as carrier aggregation.

Carrier aggregation is specific for a terminal device. Different terminal devices may be configured with different CCs, and each CC may correspond to one independent cell. In the embodiments of this application, one CC may be equivalent to one cell. For example, a primary serving cell (PCell) corresponds to a primary CC (or referred to as a primary component carrier), and may be a cell in which initial connection establishment is performed for a terminal, a cell in which RRC connection reestablishment is performed, or a primary serving cell specified in a handover process. A secondary serving cell (SCell) corresponds to a secondary CC (or referred to as a secondary component carrier), and may be a cell added during RRC reconfiguration and used to provide additional radio resources.

For a terminal device in connected mode, if carrier aggregation is not configured, the terminal device has one serving cell, or if carrier aggregation is configured, the terminal device may have a plurality of serving cells, which may be referred to as a serving cell set. For example, the primary serving cell and the secondary serving cell described above constitute a serving cell set of the terminal device. In other words, the serving cell set includes at least one primary serving cell and at least one secondary serving cell. Alternatively, in other words, a terminal configured with carrier aggregation may be connected to one PCell and a plurality of SCells. For example, in NR, a terminal device configured with carrier aggregation may be connected to one PCell and a maximum of four SCells.

12. A transmission configuration indicator (TCI) state may be used to indicate a QCL relationship between two reference signals. Each TCI state may include an index (ServeCellIndex) of a serving cell, a bandwidth part (BWP) identifier (ID), and a reference signal resource identifier. For example, the reference signal resource identifier may be at least one of the following: a non-zero power (NZP) CSI-RS reference signal resource identifier (NZP-CSI-RS-ResourceId), a non-zero power CSI-RS reference signal resource set identifier (NZP-CSI-RS-ResourceSetId), or an SSB index (SSB-Index).

The index of the serving cell, the BWP ID, and the reference signal resource identifier refer to a reference signal resource used in a beam training process and a serving cell corresponding to the reference signal resource and a BWP corresponding to the reference signal resource. In the beam training process, the network device sends reference signals based on different reference signal resources by using different transmit beams. Therefore, reference signals sent by using different transmit beams may be associated with different reference signal resources. The terminal device receives reference signals based on different reference signal resources by using different receive beams. Therefore, reference signals received by using different receive beams may also be associated with different reference signal resources. Therefore, in the beam training process, the terminal device may maintain the index of the serving cell, the BWP ID, and a correspondence between a reference signal resource identifier and a receive beam, and the network device may maintain the index of the serving cell, the BWP ID, and a correspondence between a reference signal resource identifier and a transmit beam. A pairing relationship between the receive beam and the transmit beam can be established by using the reference signal resource identifier.

In a subsequent communication process, the terminal device may determine a receive beam based on a TCI state indicated by the network device, and the network device may determine a transmit beam based on the same TCI state.

Specifically, the network device may configure a TCI state list for the terminal device by using higher layer signaling (for example, an RRC message). The TCI state list may include a plurality of TCI states. Subsequently, the network device may activate one or more TCI states by using higher layer signaling (for example, a MAC CE). The activated TCI state is a subset of the TCI state list configured by using the RRC message. Subsequently, the network device may further indicate a selected TCI state by using a TCI field in physical layer signaling (for example, downlink control information (DCI)). The DCI may be, for example, DCI applicable to scheduling of a physical downlink resource (for example, a PDSCH).

13. Beam: A beam may be represented by a spatial filter, or referred to as a spatial filter or a spatial parameter in an NR protocol. A beam used to send a signal may be referred to as a transmit beam (Tx beam), or may be referred to as a spatial transmit filter (spatial domain transmit filter), or a spatial transmit parameter (spatial domain transmit parameter). A beam used to receive a signal may be referred to as a receive beam (Rx beam), or may be referred to as a spatial receive filter (spatial domain receive filter), or a spatial receive parameter (spatial domain receive parameter).

A transmit beam may be distribution of signal strength formed in different directions in space after a signal is transmitted by using an antenna. A receive beam may be distribution of signal strength in different directions in space of a radio signal received from an antenna.

14. A beam pairing relationship is a pairing relationship between a transmit beam and a receive beam, in other words, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal through beam sweeping, and the receive end may also receive the reference signal through beam sweeping. Specifically, the transmit end may form beams with different directivities in space through beamforming, and may perform polling on a plurality of beams with different directivities, to transmit the reference signal by using the beams with different directivities, so that power of transmitting the reference signal by the transmit end in a direction pointed to by the transmit beam can reach a maximum. The receive end may also form beams with different directivities in space through beamforming, and may perform polling on a plurality of beams with different directivities, to receive the reference signal by using the beams with different directivities, so that power of receiving the reference signal by the receive end in a direction pointed to by the transmit beam can reach a maximum.

By traversing transmit beams and receive beams, the receive end may perform channel measurement based on the received reference signal, and report a measurement result to the transmit end by using CSI. For example, the receive end may report some reference signal resources with relatively large reference signal received power (RSRP) to the transmit end, for example, report an identifier of the reference signal resource, so that the transmit end receives and sends, during transmission of data or signaling, a signal by using a beam pairing relationship with relatively good channel quality.

For ease of understanding of the embodiments of this application, a communications system shown in FIG. 1 is first used as an example to describe in detail a communications system applicable to the method provided in the embodiments of this application. FIG. 1 is a schematic diagram of a communications system boo applicable to a method for sending HARQ-ACK information and a method for receiving HARQ-ACK information according to an embodiment of this application. As shown in the figure, the communications system 100 may include at least one terminal device, for example, a terminal device 101 shown in the figure. The communications system 100 may further include at least two network devices, for example, a network device #1 102 and a network device #2 103 shown in the figure. The network device #1 102 and the network device #2 103 may be network devices in a same cell, or may be network devices in different cells. This is not limited in this application. The figure is merely an example showing that the network device #1 102 and the network device #2 103 are located in a same cell.

In the communications system 100, the network device #1 102 and the network device #2 103 may communicate with each other through a backhaul (backhaul) link. The backhaul link may be a wired backhaul link (for example, an optical fiber or a copper cable), or may be a wireless backhaul link (for example, a microwave). The network device #1 102 and the network device #2 103 may cooperate with each other to serve the terminal device 101. Therefore, the terminal device 101 may separately communicate with the network device #1 102 and the network device #2 103 through a radio link.

In addition, one or more of the network device #1 102 and the network device #2 103 may alternatively schedule a PDSCH for the terminal device 101 on one or more CCs by using a carrier aggregation technology. For example, the network device #1 102 may schedule a PDSCH for the terminal device 101 on a CC #1 and a CC #2, and the network device #2 103 may schedule a PDSCH for the terminal device 101 on the CC #1 and a CC #3. CCs scheduled by the network device #1 102 and the network device #2 103 may be the same or different. This is not limited in this application.

A communication latency between network devices that cooperate with each other may be classified into an ideal backhaul and a non-ideal backhaul. In an ideal backhaul, a communication latency between two sites may be at a microsecond level, and may be ignored compared with scheduling at a millisecond level in NR. A communication latency between two sites in a non-ideal backhaul may be at a millisecond level, and cannot be ignored compared with scheduling at a millisecond level in NR.

Therefore, a solution of multi-site scheduling based on a plurality of pieces of DCI (multi-site scheduling for short below) is proposed. In the multi-site scheduling solution, a plurality of network devices are supported in separately scheduling respective PDSCHs for the terminal device by using DCI respectively sent by the plurality of network devices, to transmit data. For example, the network device #1 102 in FIG. 1 may send a PDCCH to the terminal device 101. The PDCCH may carry DCI, the DCI may be used to schedule a PDSCH for the terminal device 103, and for ease of differentiation, the PDSCH is denoted as a PDSCH #1. Similarly, the network device #2 103 may send a PDCCH to the terminal device 102. The PDCCH may also carry DCI, the DCI may also be used to schedule a PDSCH for the terminal device 103, and for ease of differentiation, the PDSCH is denoted as a PDSCH #2. In other words, the terminal device 101 may receive the PDSCH #1 from the network device #1, and may receive the PDSCH #2 from the network device #2.

However, in a case of multi-site scheduling, how to feed back HARQ-ACK information for each PDSCH so that the network device accurately obtains receiving and decoding statuses of each PDSCH becomes a technical problem to be urgently resolved.

Based on this, this application provides a method for sending HARQ-ACK information and a method for receiving HARQ-ACK information. In a multi-site scheduling scenario, HARQ-ACK information can be separately fed back for PDSCHs from different sites, so that a network device can accurately learn of data receiving and decoding statuses, and retransmit data that is not successfully received or data that is not successfully decoded in a timely manner, thereby helping improve data transmission performance and improve user experience.

It should be understood that the method for sending HARQ-ACK information and the method for receiving HARQ-ACK information provided in this application are applicable to a wireless communications system, for example, the communications system 100 shown in FIG. 1. The terminal device in the embodiments of this application may simultaneously communicate with one or more network devices. For example, the network device in the embodiments of this application may correspond to either of the network device #1 102 and the network device #3 103 in FIG. 1, and the terminal device in the embodiments of this application may correspond to the terminal device 101 in FIG. 1.

Without loss of generality, the following describes in detail the embodiments of this application by using an interaction process between one terminal device and two network devices as an example. The two network devices may both serve the terminal device, or the terminal device may separately communicate with the two network devices.

It may be understood that any terminal device in the wireless communications system may feed back HARQ-ACK information to the network device based on a same technical solution. This is not limited in this application.

The following describes in detail the method for sending HARQ-ACK information and the method for receiving HARQ-ACK information provided in the embodiments of this application with reference to the accompanying drawings.

Figure 2:
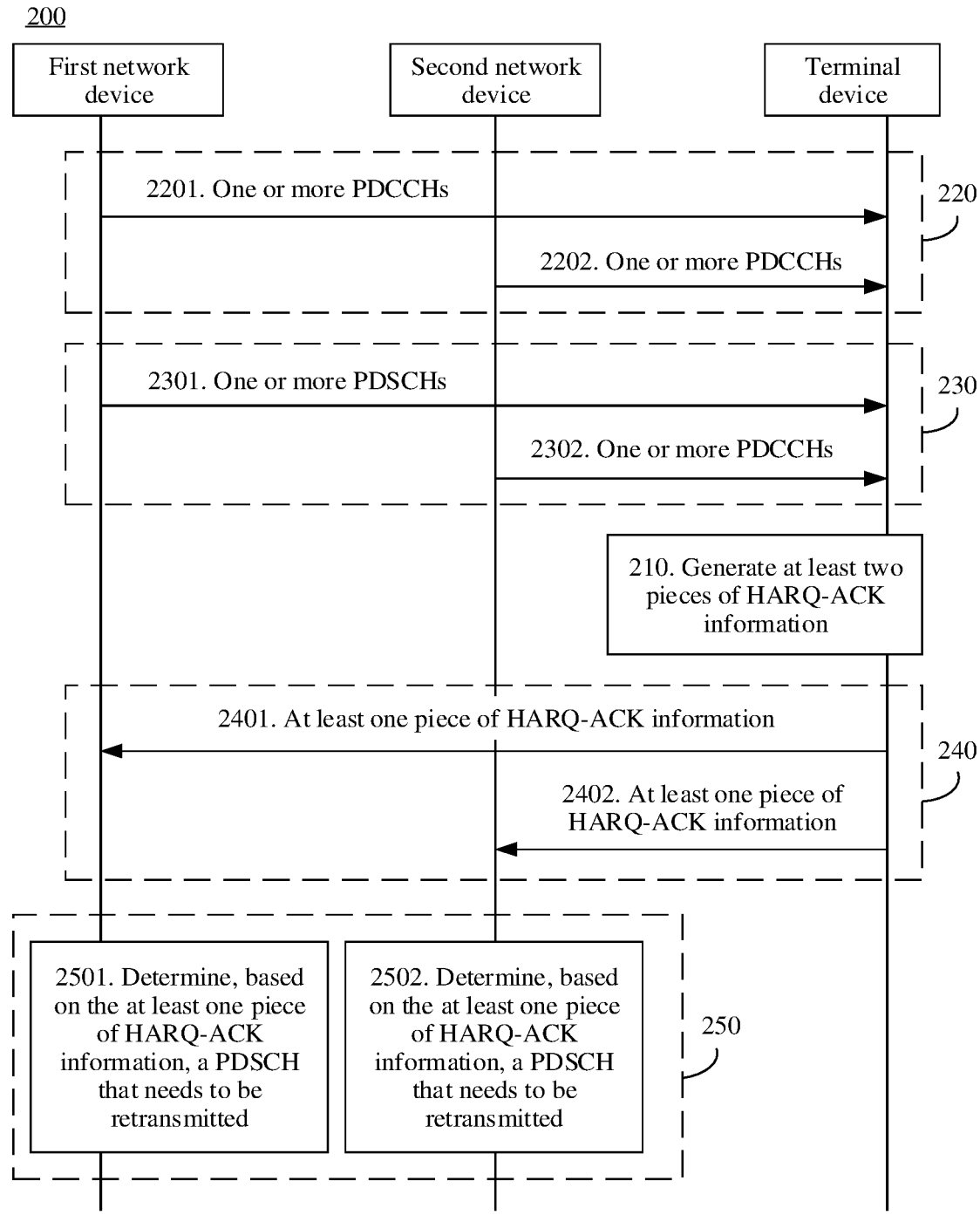
FIG. 2 is a schematic flowchart of a method for sending and receiving HARQ-ACK information according to an embodiment of this application.

FIG. 2 is a schematic flowchart of a method 200 for sending and receiving HARQ-ACK information according to an embodiment of this application from a perspective of device interaction. As shown, the method 200 may include step 210 to step 250. The following describes in detail the steps in the method 200.

In step 210, a terminal device generates at least two pieces of HARQ-ACK information based on a plurality of received PDSCHs.

Specifically, the plurality of PDSCHs may be PDSCHs from a plurality of network devices, and the plurality of PDSCHs may be respectively scheduled by the plurality of network devices by using respective PDCCHs. The plurality of network devices may include, for example, the foregoing first network device and second network device.

Optionally, before step 210, the method 200 further includes step 220: The terminal device receives a plurality of PDCCHs. Correspondingly, step 220 may include the following two steps: Step 2201: The first network device sends one or more PDCCHs. Step 2202: The second network device sends one or more PDCCHs.

Each PDCCH may be used to schedule one or more PDSCHs. More specifically, DCI carried in each PDCCH may be used to schedule one or more PDSCHs. Each network device may add DCI to a PDCCH sent by the network device, and each piece of DCI may include information such as a time-frequency resource, an antenna port, and an enabled transport block of a scheduled PDSCH. Each piece of DCI may further include information about an uplink resource used to transmit feedback information of the scheduled PDSCH. For example, the DCI may include a PUCCH resource indicator field, used to indicate the uplink resource. In other words, the plurality of PDSCHs scheduled by the plurality of PDCCHs may be PDSCHs received before the uplink resource arrives, and the PDCCHs used to schedule the plurality of PDSCHs may also be PDCCHs received before the uplink resource arrives.

When feedback information of PDSCHs scheduled by the network device is configured to be transmitted on a same uplink resource, the terminal device may generate corresponding feedback information for a plurality of PDSCHs received in a time period before the uplink resource arrives, and send the feedback information to the network device by using the uplink resource.

Optionally, before step 210, the method further includes step 230: The terminal device receives a plurality of PDSCHs. Correspondingly, step 230 may include the following two steps: Step 2301: The first network device sends one or more PDSCHs. Step 2302: The second network device sends one or more PDSCHs.

The terminal device may receive the one or more PDSCHs from the first network device based on the one or more PDCCHs received in step 2201, and may receive the one or more PDSCHs from the second network device based on the one or more PDCCHs received in step 2202. A specific method for scheduling the PDSCH by the network device by using the PDCCH may be the same as that in the current technology. For brevity, detailed description of a specific process thereof is omitted herein.

After receiving the plurality of PDSCHs, the terminal device may generate HARQ-ACK information based on each of the plurality of PDSCHs, to feed back an ACK or a NACK for each PDSCH to the network device. For example, the terminal device may feed back an ACK when the PDSCH is successfully received and successfully decoded, and feed back a NACK when the PDSCH is not successfully received or not successfully decoded. In this embodiment of this application, for ease of description, an ACK or a NACK fed back for a PDSCH in the HARQ-ACK information is collectively referred to as feedback information for the PDSCH.

For ease of understanding, the following describes different cases of the PDSCH information and the HARQ-ACK information in time domain with reference to the accompanying drawings.

Figure 3:
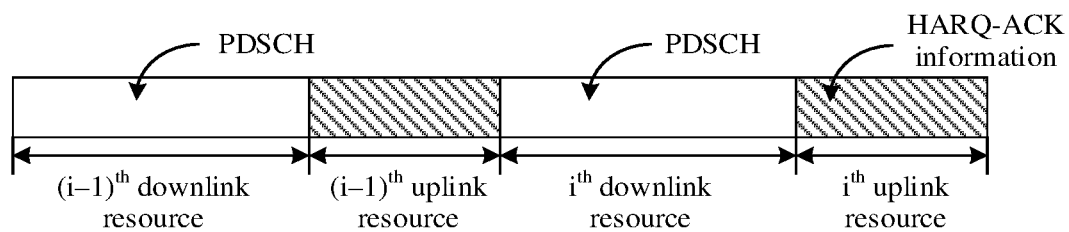
FIG. 3 is a schematic diagram of distribution of PDSCHs and HARQ-ACK information in time domain according to an embodiment of this application.

FIG. 3 is a schematic diagram of distribution of PDSCHs and HARQ-ACK information in time domain according to an embodiment of this application. It should be noted that each uplink resource and each downlink resource shown in FIG. 3 may separately include one or more slots. As shown in the figure, the uplink resource and the downlink resource shown in the figure do not overlap in time domain. The terminal device may receive the plurality of PDSCHs on a downlink resource before an $i^{th}$ ($i \geq 0$, and i is an integer) uplink resource in time domain. For example, the terminal device may receive a PDSCH on an $i^{th}$ downlink resource, or may receive a PDSCH on an $(i-1)^{th}$ downlink resource before an $(i-1)^{th}$ uplink resource, or may receive a PDSCH on any downlink resource before an $(i-1)^{th}$ uplink resource. Provided that feedback information of PDSCHs scheduled by a network device by using PDCCHs is transmitted on the $i^{th}$ uplink resource, all the PDSCHs scheduled by the using the PDCCHs may be included in the plurality of PDSCHs.

It should be understood that FIG. 3 is shown only for ease of understanding, and should not constitute any limitation on this application. An uplink resource used to send a HARQ-ACK may occupy part or all of an $(i+1)^{th}$ uplink resource shown in FIG. 3. This is not limited in this application. In addition, FIG. 3 shows only distribution of the PDSCHs and the HARQ-ACK information in time domain. Distribution of the PDSCHs and the HARQ-ACK information in frequency domain is not limited in this application.

It should be further understood that a sequential order of the uplink resources and the downlink resources in time domain shown in FIG. 3 is merely an example, and should not constitute any limitation on this application. For example, the $i^{th}$ uplink resource may be located before the $i^{th}$ downlink resource, or the $(i-1)^{th}$ uplink resource may be located before the $(i-1)^{th}$ downlink resource.

It should be noted that in the current technology, when receiving the plurality of PDSCHs, the terminal device does not know whether the plurality of PDSCHs are from a same network device. In other words, when a network device sends a PDSCH to the terminal device, the network device does not explicitly notify the terminal device of the network device that sends each PDSCH.

However, in this embodiment, the terminal device may group the plurality of received PDSCHs based on at least one type of the following information of each received PDSCH: a DMRS port group to which a DMRS port belongs, an enabled transport block, and a PDCCH configuration. Based on this, the terminal device may generate, based on a PDSCH group to which each PDSCH belongs, HARQ-ACK information corresponding to each PDSCH group.

In other words, the terminal device groups the plurality of received PDSCHs based on at least one of a DMRS group to which a DMRS port belongs, an enabled transport block, and a PDCCH configuration, and feeds back feedback information of a same PDSCH group by using one HARQ-ACK.

Specifically, PDSCHs that are grouped into a same PDSCH group may have at least one of the following attributes:

(a) Ports used to demodulate DMRSs of the PDSCHs belong to a same port group.

(b) Identifiers of enabled TBs carried in the PDSCHs are the same.

(c) PDCCH configurations of PDCCHs used to schedule the PDSCHs are the same.

(d) Receive beams used to receive the PDSCHs belong to a same receive beam group.

When a plurality of PDSCHs have one or more same attributes of (a), (b), (c), or (d), the plurality of PDSCHs may be considered as a same PDSCH group. It should be understood that, a process of grouping a plurality of PDSCHs is introduced herein only for ease of understanding, but this does not mean that the terminal device definitely performs an operation of grouping PDSCHs before generating the HARQ-ACK information. The terminal device may directly generate, based on the foregoing listed information, the HARQ-ACK information corresponding to each PDSCH group.

It should be noted that the terminal device may determine, based on one or more of (a), (b), (c), or (d) listed above, whether a plurality of PDSCHs are from a same network device. However, this application does not limit a plurality of PDSCHs from a same network device to definitely have one or more same attributes of (a), (b), (c), or (d) listed above. For example, a plurality of PDSCHs from a same network device may alternatively be divided into two or more groups, and when a PDSCH group includes a plurality of PDSCHs, the plurality of PDSCHs in the PDSCH group may have one or more same attributes of (a), (b), (c), or (d) listed above.

The following separately describes a specific process in which the terminal device groups a plurality of received PDSCHs with reference to the foregoing listed attributes.

(a) Ports used to demodulate DMRSs of the PDSCHs belong to a same port group.

In this embodiment, the port group may be a DMRS port group. For ease of description, the DMRS port group is referred to as a port group for short. Two or more network devices may interfere with each other if the two or more network devices use a same port when serving a same terminal device. If ports in a same port group are used, channel estimation of the terminal device may be inaccurate, and consequently, signal reception quality may be degraded. To prevent different network devices from using a same port when the network devices serve a same terminal device, different network devices usually may be limited to using ports in different port groups to serve a same terminal device. To be specific, different port groups may be used through negotiation between network devices such as a first network device and a second network device in advance by using a backhaul link. For example, the first network device may use a port group #1, and the second network device may use a port group #2. It should be understood that each network device is not limited to using one port group. For example, the first network device may use port groups #1 and #2, and the second network device may use a port group #3. It should be further understood that the port groups used by the network devices listed above are merely examples, and should not constitute any limitation on this application.

It should be noted that ports in different port groups are completely different. For example, any port in the port group #1 is different from a port in the port group #2, and any port in the port group #2 is also different from a port in the port group #1. In other words, there is no intersection between ports in the port group #1 and ports in the port group #2.

A port included in each port group may be predefined, for example, defined in a protocol, or may be indicated by the network device. For example, the network device may notify the terminal device of the port in each port group by using higher layer signaling. When the port included in each port group is indicated by the network device, optionally, the method 200 further includes: The terminal device receives indication information of a port group, where the indication information is used to indicate a port in each port group.

Correspondingly, the network device sends the indication information of the port group. The indication information may be specifically used to indicate a port number of each port included in each port group. For example, the port group #1 includes a port #8 to a port #11, and the port group #2 includes a port #12 to a port #15. The network device that sends the higher layer signaling may be the first network device, or may be the second network device, or may be another network device, for example, a network controller. This is not limited in this application.

When receiving the PDSCH, the terminal device may determine, based on an antenna port indicated by DCI carried in a PDCCH, a time-frequency resource used to transmit a DMRS, receive the DMRS on the time-frequency resource, and further perform channel estimation based on the received DMRS, to demodulate the received PDSCH. Therefore, a PDSCH scheduled by using a PDCCH may correspond to a DMRS port indicated by the same PDCCH. For ease of description in the following, a port used to demodulate a DMRS of a PDSCH is denoted as a port of the PDSCH.

Based on the foregoing design, ports of PDSCHs in a same PDSCH group belong to a same port group. When scheduling a PDSCH, the network device may notify a port of the scheduled PDSCH in advance. For example, the network device may indicate the port of the PDSCH to the terminal device by using DCI. Therefore, the terminal device may group the plurality of received PDSCHs based on pre-obtained port group information and a port of each PDSCH.

In other words, ports of PDSCHs from different network devices may belong to different port groups, that is, PDSCHs from different network devices do not belong to a same PDSCH group.

(b) Identifiers of enabled TBs carried in the PDSCHs are the same.

In this embodiment, to avoid a resource conflict problem that may occur when different network devices use a same enabled TB, enabled TBs may be pre-negotiable between network devices such as the first network device and the second network device by using a backhaul link.

For example, in a current protocol, such as an NR protocol, each piece of DCI may schedule a maximum of two codewords, and each codeword may correspond to one TB from a higher layer. Therefore, each piece of DCI can schedule a maximum of two TBs. In this embodiment, the first network device and the second network device each may enable one TB. For example, the first network device enables a TB 1, and the second network device enables a TB 2. Specifically, the first network device may indicate, in sent DCI, that the TB 1 is an enabled TB and the TB 2 is a disabled TB. The second network device may indicate, in DCI sent by the second network device, that the TB 1 is a disabled TB and the TB 2 is an enabled TB. Specific methods for indicating an enabled TB and a disabled TB by the network device have been described in detail above. For brevity, details are not described herein again.

When the first network device schedules a plurality of PDSCHs, identifiers of enabled TBs indicated in DCI used to schedule the plurality of PDSCHs may be the same. When the second network device schedules a plurality of PDSCHs, identifiers of TBs indicated in DCI used to schedule the plurality of PDSCHs may be the same. In addition, the identifiers of the enabled TBs indicated in the DCI sent by the first network device may be different from those of the enabled TBs indicated in the DCI sent by the second network device.

Based on the foregoing design, identifiers of TBs transmitted on PDSCHs in a same PDSCH group may be the same. When scheduling a PDSCH, the network device may notify in advance an identifier of an enabled TB transmitted by the scheduled PDSCH. For example, the network device may indicate the enabled TB to the terminal device by using DCI. Therefore, the terminal device may group a plurality of received PDSCHs based on the identifier of the enabled TB.

In other words, identifiers of TBs transmitted by PDSCHs from different network devices may be different, that is, PDSCHs from different network devices do not belong to a same PDSCH group.

Identifiers of TBs may be distinguished by, for example, an order in which fields of configuration information of the TBs appears in DCI, as described above; or may be distinguished by using different indexes. For example, different TBs may be distinguished by using indexes "1" and "2"; or may be distinguished in another manner. This is not limited in this application.

In addition, merely for ease of understanding, a specific method for grouping PDSCHs by the terminal device based on enabled TBs is described herein with reference to an example in which two TBs are transmitted in each TTI in a current protocol. However, this should not constitute any limitation on this application. This application does not exclude a possibility that a quantity of TBs transmitted in each TTI may be changed in a future protocol. For example, two or more TBs may be transmitted in each TTI. In this case, a quantity of network devices corresponding to enabled TBs may also increase. In addition, when a quantity of TBs transmitted in each TTI increases, a quantity of TBs enabled by each network device may also increase. This is not limited in this application.

(c) PDCCH configurations of PDCCHs used to schedule the PDSCHs are the same.

As described above, a PDCCH configuration may be used to determine a search space. Specifically, the PDCCH configuration includes a control resource set and a search space, and the terminal device may determine a search space of the PDCCH based on the control resource set and the search space set in the PDCCH configuration.

In this embodiment, different network devices may send respective PDCCHs in different search spaces, that is, send respective PDCCHs based on different PDCCH configurations. The different PDCCH configurations described herein may include, for example, different control resource sets, different search space sets, or both different control resource sets and different search space sets The network device may indicate different PDCCH configurations to the terminal device by using higher layer signaling.

For example, the network device configures a control resource set #1, a control resource set #2, a search space set #1, and a search space set #2 in a PDCCH configuration #1, and may further indicate, in a higher-level parameter used to configure a search space set, the search space set #1 to be associated with the control resource set #1 and the search space set #2 to be associated with the control resource set #2. In other words, the search space may include resources determined based on the search space set #1 and the control resource set #1 and resources determined based on the search space set #2 and the control resource set #2.

The network device may further configure a control resource set #3, a control resource set #4, a search space set #1, and a search space set #2 by using a PDCCH configuration #2, and may further indicate, in a higher-level parameter used to configure a search space set, the search space set #1 to be associated with the control resource set #3 and the search space set #2 to manage the control resource set #4. In other words, the search space may include resources determined based on the search space set #1 and the control resource set #3 and resources determined based on the search space set #2 and the control resource set #4.

The network device may further configure a control resource set #5, a control resource set #6, a search space set #5, and a search space set #6 by using a PDCCH configuration #3, and may further indicate, in a higher-level parameter used to configure a search space set, the search space set #5 to be associated with the control resource set #5 and the search space set #6 to be associated with the control resource set #6. In other words, the search space may include resources determined based on the search space set #5 and the control resource set #5 and resources determined based on the search space set #6 and the control resource set #6.

Therefore, when PDCCH configurations are different, search spaces for blind detection of PDCCHs are also different. When blindly detecting PDCCHs, the terminal device may traverse search spaces determined by PDCCH configurations to receive a PDCCH. When receiving the PDCCH, the terminal device can determine a PDCCH configuration based on which a search space is determined, where the PDCCH is received based on the search space. In other words, there is a correspondence between a PDCCH sent by a same network device and a PDCCH configuration.

However, this application does not limit PDCCHs sent by each network device to be blindly detected based on one PDCCH configuration. PDCCHs sent by a same network device may be blindly detected based on a plurality of PDCCH configurations, but PDCCHs sent by different network devices may be blindly detected based on different PDCCH configurations. For example, a PDCCH #1 sent by the first network device may be blindly detected based on the PDCCH configuration 1, a PDCCH #2 sent by the first network device may be blindly detected based on the PDCCH configuration 2, and a PDCCH #3 sent by the second network device may be blindly detected based on the PDCCH configuration 3. It should be understood that the correspondence between the PDCCH and the PDCCH configuration listed above is merely an example, and should not constitute any limitation on this application.

Based on the foregoing design, time-frequency resources used to schedule PDCCHs in a same PDSCH group may be determined based on a same PDCCH configuration, or may be determined from a range of a same search space. Search spaces for blindly detecting a same PDSCH group by the terminal device may be determined based on a same PDCCH configuration. Therefore, the terminal device may receive the PDCCH based on the PDCCH configuration, and group PDSCHs scheduled by the PDCCHs received in search spaces determined by different PDCCH configurations.

In other words, when different network devices schedule a PDSCH, time-frequency resources of PDCCHs sent by the different network devices may be determined based on different PDCCH configurations, or may be determined from ranges of different search spaces. Search spaces for blindly detecting PDCCHs from different network devices by the terminal device may be determined based on different PDCCH configurations. Therefore, PDSCHs from different network devices do not belong to a PDSCH group.

Further, the attribute (c) may be further extended as follows: The PDCCHs used to schedule the PDSCH have a same PDCCH configuration group.

Specifically, when the first network device and the second network device serve a same terminal device based on a CoMP technology, the first network device and/or the second network device further schedule more spectrum resources for the terminal device based on carrier aggregation. For example, the first network device may schedule a PDSCH for the terminal device on a CC #1 and a CC #2, and the second network device may schedule a PDSCH for the terminal device on the CC #2 and a CC #3. In this case, the first network device may separately send the PDCCH to the terminal device on the CC #1 and the CC #2, and the second network device may separately send the PDCCH to the terminal device on the CC #2 and the CC #3. The PDCCH configuration is configured based on each BWP of each cell. The first network device may separately send the PDCCH on the CC #1 and the CC #2 based on different PDCCH configurations, and the second network device may separately send the PDCCH on the CC #2 and the CC #3 based on different PDCCH configurations. Therefore, the terminal device may generate four pieces of HARQ-ACK information based on different PDCCH configurations, where two pieces of HARQ-ACK information are sent to the first network device, and the other two pieces of HARQ-ACK information are sent to the second network device.

This application further proposes a concept of a PDCCH configuration group. Each PDCCH configuration group may include a plurality of PDCCH configurations, and each configuration is configured based on one BWP in one cell. The PDCCH configuration group may be configured by using higher layer signaling. For example, an included PDCCH configuration may be indicated in a PDCCH configuration group. Alternatively, when each PDCCH configuration is configured by using higher layer signaling, an indication field may be added to indicate a PDCCH configuration group to which the PDCCH configuration belongs.

A same network device may send PDCCHs to the terminal device in different cells based on PDCCHs in the PDCCH configuration group. When determining that PDCCH configurations on which the blindly detected PDCCHs are based belong to a same PDCCH configuration group, the terminal device may consider that the PDCCHs blindly detected based on the same PDCCH configuration group belong to a same PDCCH group, and PDSCHs scheduled by the same PDCCH group may belong to a same PDSCH group. Therefore, the terminal device may generate one piece of HARQ-ACK information for the PDSCH group.

Based on the foregoing design, time-frequency resources used to schedule PDCCHs in a same PDSCH group may be determined based on a same PDCCH configuration group. Search spaces for blindly detecting a same PDSCH group by the terminal device may be determined based on a same PDCCH configuration group. Therefore, the terminal device may blindly detect PDCCHs based on a PDCCH configuration, and may group, based on a PDCCH configuration group on which the blindly detected PDCCHs are based, PDSCHs scheduled by the PDCCHs.

In other words, when different network devices schedule a PDSCH, time-frequency resources of PDCCHs sent by the different network devices may be determined based on different PDCCH configuration groups. Search spaces for blindly detecting PDCCHs from different network devices by the terminal device may be determined based on different PDCCH configuration groups. Therefore, PDSCHs from different network devices do not belong to a PDSCH group.

It should be understood that the PDCCH configuration group is merely another possible attribute used to group PDSCHs, and should not constitute any limitation on this application. Alternatively, the terminal device may directly group PDSCHs based on whether PDCCH configurations of blindly detected PDCCHs are the same.

It should be further understood that when different network devices schedule more frequency domain resources for a same terminal device by using a carrier aggregation technology, scheduled CCs may be a same CC, or may be different CCs. This is not limited in this application.

(d) PDSCHs corresponding to a same piece of HARQ-ACK information are received by receive beams in a same receive beam group.

In this embodiment, receive beams of the terminal device may be grouped, and a PDCCH and a PDSCH from a same network device are received by using receive beams in a same receive beam group.

As described above, the network device may add a TCI to DCI, and indicate a selected TCI state by using the TCI. Each TCI state may include an identifier of a reference signal resource used to determine a receive beam. In other words, there is a correspondence between the identifier of the reference signal resource and the receive beam. Therefore, in an implementation, grouping the receive beams may also be implemented by grouping reference signal resources.

Specifically, the network device may indicate a plurality of reference signal resource groups by using signaling, and each reference signal resource group includes one or more reference signal resources. The terminal device may determine a receive beam based on an identifier of a reference signal resource indicated in a TCI state, and receive the PDSCH from the network device by using the receive beam corresponding to the reference signal resource. When receive beams used by the terminal device to receive a plurality of PDSCHs belong to a same receive beam group, reference signal resources included in TCI states indicated by TCIs in DCI used to schedule the plurality of PDSCHs also belong to a same reference signal resource group. In this case, feedback information of the plurality of PDSCHs may be placed in a same piece of HARQ-ACK information.

Usually, receive beams in a same receive beam group may be configured on a same antenna panel (panel). Therefore, in another implementation, an indication field may be added to an existing TCI state to distinguish different receive beam groups.

For example, an indication field related to the antenna panel may be added to the TCI state. For example, "panel1" represents an antenna panel 1, and "panel2" represents an antenna panel 2. The network device may indicate an available TCI state by using the TCI, to further indicate the terminal device to use which antenna panel to receive the PDSCH. When the terminal device receives a plurality of PDSCHs by using receive antennas on a same antenna panel, it may be considered that receive beams of the plurality of PDSCHs belong to a same receive beam group. In this case, feedback information of the plurality of PDSCHs may be placed in a same piece of HARQ-ACK information.

It should be understood that the indication field related to the antenna panel is not limited to the foregoing examples, and the indication field related to the antenna panel is not limited in this application. It should be further understood that different receive beam groups are distinguished by using a reference signal resource and an antenna panel, and the grouping of the PDSCHs is merely a possible implementation, and should not constitute any limitation on this application. This application does not exclude a possibility that different receive beam groups are distinguished in another manner.

In addition to the foregoing listed attributes (a), (b), (c), and (d), this application further provides another manner that may be used to group PDSCHs. For example, PDSCHs are grouped based on DCI types.

Optionally, types of scheduling DCI of PDSCHs corresponding to a same piece of HARQ-ACK information are the same. The generating at least two pieces of HARQ-ACK information based on a plurality of received PDSCHs includes: generating at least two pieces of HARQ-ACK information based on the plurality of received PDSCHs and types of a plurality of DCI used to schedule the plurality of PDSCHs. PDSCHs corresponding to each piece of HARQ-ACK information are scheduled by a same type of DCI.

Because the DCI may be carried in the PDCCH and sent to the terminal device, a DCI type may also be extended to a PDCCH type. In other words, types of scheduling PDCCHs of PDSCHs corresponding to a same piece of HARQ-ACK information are the same.

The following describes in detail the DCI type.

Based on different content included in DCI, the DCI may be classified into primary DCI and secondary DCI. Information included in the secondary DCI may be a subset of information included in the primary DCI. In other words, the secondary DCI includes only some indicator fields included in the primary DCI, that is, the primary DCI includes more indication information than the secondary DCI. Alternatively, the primary DCI and the secondary DCI may include different information. For example, the primary DCI may be DCI including one or more specific parameters. The specific parameter may include, for example, at least one of the following: a carrier indicator, a bandwidth part indicator, a rate matching indicator, or a zero power channel state information reference signal trigger (ZP CSI-RS trigger). Correspondingly, the secondary DCI may be DCI that does not include any one of the foregoing specific parameters. The secondary DCI may be DCI including at least one of the following: resource allocation, a modulation and coding scheme (MCS), a redundancy version (RV), a new data indicator (NDI), and a HARQ process identifier (HARQ process ID). When DCI blindly detected by the terminal device includes primary DCI and secondary DCI, it may be considered that a PDSCH scheduled by using the primary DCI is a PDSCH group, and a PDSCH scheduled by using the secondary DCI is another PDSCH group.

In addition, based on different content included in the DCI, the DCI may be further classified into first-level DCI and second-level DCI. The first-level DCI may indicate whether the second-level DCI exists, and may further indicate a time domain location and/or a frequency domain location of the second-level DCI. When the DCI blindly detected by the terminal device includes first-level DCI and second-level DCI, it may be considered that a PDSCH scheduled by using the first-level DCI is a PDSCH group, and a PDSCH scheduled by using the second-level DCI is another PDSCH group.

Based on different occurrence frequencies of DCI, the DCI may be classified into fast DCI and slow DCI. An occurrence frequency of the fast DCI is higher than an occurrence frequency of the slow DCI. For example, the fast DCI may appear once in each slot, and the slow DCI may appear once in a plurality of slots. When the DCI blindly detected by the terminal device includes fast DCI and slow DCI, it may be considered that a PDSCH scheduled by using the fast DCI is one PDSCH group, and a PDSCH scheduled by using the slow DCI is another PDSCH group.

Based on different DCI formats, the DCI may be further classified into DCI in different formats, for example, DCI format 1_0 and DCI format 1_1. When the DCI blindly detected by the terminal device includes the DCI format 1_0 and the DCI format 1_1, it may be considered that a PDSCH scheduled by using the DCI format 1_0 is a PDSCH group, and a PDSCH scheduled by using the second-level DCI format 1_1 is another PDSCH group.

The DCI may also be grouped based on different configurations of a same DCI format. For example, one piece of DCI includes only a field (which may specifically include an MCS, an NDI, and an RV) of configuration information of one TB, and another piece of DCI includes a field of configuration information of two TBs. When the DCI blindly detected by the terminal device includes DCI with different configurations of a same DCI format, it may be considered that PDSCHs scheduled by using DCI with a same configuration of a same DCI format belong to a same PDSCH group, and PDSCHs scheduled by using DCI with different configurations of a same DCI format do not belong to a same PDSCH group.

Based on different types of DCI listed above, the terminal device may determine, based on a type of DCI carried in a blindly detected PDCCH, feedback information of which PDSCHs in PDSCHs scheduled by using each PDCCH may be placed in a same piece of HARQ-ACK information.

It should be understood that the DCI types listed above are merely examples, and should not constitute any limitation on this application. The terminal device may alternatively group the scheduled PDSCHs based on more types of DCI.

It should be further understood that, it may be defined in a protocol that PDSCHs are grouped based on one of the foregoing listed attributes, for example, PDSCH ports. In this case, the network device may send the PDCCH and schedule the PDSCH for the terminal device based on the attribute defined in the protocol, or the terminal device may determine, based on a same attribute, which PDSCHs are from a same network device.

It should be further understood that when it is defined in a protocol that a PDSCH group is determined based on one of the foregoing listed attributes, it does not mean that other attributes of PDSCHs in a same group are different. For example, when it is defined in a protocol that received PDSCHs are grouped based on a port group, ports of PDSCHs in a same PDSCH group belong to a same port group, identifiers of enabled TBs transmitted by the PDSCHs in the same PDSCH group may be the same or may be different, and search spaces of PDCCHs used to schedule the PDSCHs in the same PDSCH group may be the same or different. This is not limited in this application.

Based on the foregoing method, the terminal device may determine which PDSCHs are from a same network device, and then generate HARQ-ACK information for each PDSCH from the same network device. In other words, the terminal device may generate one piece of HARQ-ACK information based on one PDSCH group. Each piece of HARQ-ACK information may feed back an ACK or a NACK for each PDSCH in a PDSCH group. Therefore, each piece of HARQ-ACK information may feed back an ACK or a NACK for one or more PDSCHs. For ease of description, one or more PDSCHs to which feedback information included in one piece of HARQ-ACK information is directed are referred to as one or more PDSCHs corresponding to the HARQ-ACK information. When the HARQ-ACK information corresponds to a plurality of PDSCHs, the plurality of PDSCHs may meet at least one of the foregoing listed same attributes a, b, and c.

It should be understood that PDSCHs in a same PDSCH group may be PDSCHs from a same network device, and PDSCHs in different PDSCH groups may be PDSCHs from different network devices or may be PDSCHs from a same network device.

Although the terminal device cannot determine whether PDSCHs in different PDSCH groups are from a same network device, the terminal device may determine which PDSCHs are from a same network device. Therefore, the terminal device may generate, based on each PDSCH in a same PDSCH group, HARQ-ACK information corresponding to the PDSCH group. When there are a plurality of PDSCH groups, corresponding HARQ-ACK information may be separately generated based on each PDSCH in each PDSCH group.

On the contrary, if the terminal device does not predetermine which PDSCHs belong to a same PDSCH group, the terminal device may place feedback information of PDSCHs of different groups in a same piece of HARQ-ACK information for feedback when generating HARQ information. However, PDSCHs of different groups may be PDSCHs not from a same network device, and feedback information of PDSCHs from the first network device may be sent to the second network device, and the second network device may make an incorrect decision based on the feedback information.

For example, it is assumed that the first network device sends the PDSCH #1 and the PDSCH #2 to the terminal device, and the second network device sends a PDSCH #3 and a PDSCH #4 to the terminal device. However, if the terminal device does not know which PDSCHs are from a same site, the terminal device may place feedback information of the PDSCH #1 from the first network device and feedback information of the PDSCH #3 from the second network device in the HARQ-ACK information to be fed back to the first network device. In this case, the first network device may consider the feedback information for the PDSCH #3 as feedback information for the PDSCH #2 sent by the first network device, and therefore may make an incorrect decision. For example, when the PDSCH #3 is successfully received and successfully decoded, but the PDSCH #2 is not received, or the PDSCH #2 is not successfully received, or the PDSCH #2 is not successfully decoded, the first network device mistakenly considers that the PDSCH #2 is successfully received and successfully decoded, and continues to transmit new data. Alternatively, when the PDSCH #3 is not received, or is not successfully received, or is not successfully decoded, but the PDSCH #2 is successfully received and successfully decoded, the first network device retransmits the PDSCH #2, causing a waste of transmission resources. In addition, the terminal device may also feed back incorrect information to the second network device. For example, the feedback information of the PDSCH #2 is used as feedback information of the PDSCH #3 and is placed in HARQ-ACK information to be fed back to the second network device. As a result, the PDSCH #3 cannot be retransmitted, and the terminal device may always fail to receive the PDSCH #3. On the whole, data transmission performance may be degraded and user experience may be poor.

In this embodiment of this application, although the terminal device cannot determine a correspondence between each PDSCH and a network device, the terminal device can determine which PDSCHs do not belong to a same PDSCH group, that is, can determine feedback information of which PDSCHs may be placed in a same piece of HARQ-ACK information for feedback, and feedback information of which PDSCHs cannot be placed in a same piece of HARQ-ACK information for feedback. Therefore, it is possible to avoid a possibility that the foregoing listed feedback information of the PDSCHs from the second network device is mistakenly considered as feedback information of the PDSCHs from the first network device, thereby ensuring that the network device can accurately learn of receiving and decoding statuses of a PDSCH scheduled by the network device, and can further perform proper determining, for example, determine which PDSCHs need to be retransmitted.

In this embodiment, before generating the at least two pieces of HARQ-ACK information, the terminal device may predetermine a length of each piece of HARQ-ACK information and a location of feedback information of each PDSCH in the HARQ-ACK information, to generate the HARQ-ACK information.

Optionally, the method 200 further includes: The terminal device determines a length of each piece of HARQ-ACK information.

As described above, based on DCI for scheduling a PDSCH group, a plurality of pieces of DCI sent by the network device may also be divided into at least two DCI groups. The terminal device may determine, based on last received DCI in each DCI group, a length of HARQ-ACK information of the corresponding PDSCH group.

For example, the terminal device may determine a length of first HARQ-ACK information based on last received DCI in a first DCI group, and the terminal device may further determine a length of second HARQ-ACK information based on last received DCI in a second DCI group.

Specifically, the terminal device may determine the length of the HARQ-ACK information based on a DAI in the DCI. Based on different scenarios, the terminal device may determine the length of the HARQ-ACK information based on different types of DAIs.

If the first network device and the second network device serve a same terminal device based on a CoMP technology, the terminal device may determine the length of each piece of HARQ-ACK information based on a DAI in last received DCI in each DCI group. In this case, the DAI may be a counter DAI. Each counter DAI is used to indicate a sequence number of a PDSCH scheduled by using DCI in which the counter DAI is located. Therefore, provided that the last DCI is not lost, the terminal device can determine, based on the counter DAI in the last received DCI, a total quantity of PDSCHs scheduled by the network device, and further determine a length of the corresponding HARQ-ACK information.

When the first network device and the second network device serve a same terminal device based on the CoMP technology, if the first network device and/or the second network device further schedule more spectrum resources for the terminal device based on a carrier aggregation technology, the terminal device can also determine the length of each piece of HARQ-ACK information based on the DAI in the last received DCI in each DCI group. In this case, the DCI sent by the network device (for example, the first network device) that uses carrier aggregation may include counter DCI and total DCI. The counter DAI may be used to indicate a sequence number of a PDSCH that is currently scheduled by the first network device. The total DAI may be used to indicate a total quantity of PDSCHs currently scheduled by the first network device. The terminal device may determine, based on the total DM, the total quantity of PDSCHs scheduled by the first network device, and further determine the length of the corresponding HARQ-ACK information.

For example, the first network device may schedule four PDSCHs for the terminal device at the same time, and the four PDSCHs may respectively use frequency domain resources of four CCs. The four PDSCHs may include, for example, a PDSCH transmitted on a CC #1, a counter DAI in DCI used to schedule the PDSCH may be 0, and a total DAI may be 4. The four PDSCHs may further include, for example, a PDSCH transmitted on a CC #2, a counter DAI in DCI used to schedule the PDSCH may be 1, and a total DAI may be 4. The four PDSCHs may further include, for example, a PDSCH transmitted on a CC #3, a counter DAI in DCI used to schedule the PDSCH may be 2, and a total DAI may be 4. The four PDSCHs may further include, for example, a PDSCH transmitted on a CC #4, a counter DAI in DCI used to schedule the PDSCH may be 3, and a total DAI may be 4. Therefore, provided that the last DCI is not lost, the terminal device can determine, based on the total DAI in the last received DCI, the total quantity of PDSCHs scheduled by the first network device, and further determine a length of the corresponding HARQ-ACK information. In addition, the terminal device may further determine, based on whether counter DAIs are consecutive, whether there is lost DCI, or determine, based on a total quantity of scheduled PDSCHs that is indicated in a total DAI and a total quantity of received PDSCHs, whether there is a lost PDSCH.

It should be noted that, in some cases, the network device may schedule a plurality of same PDSCHs by using one piece of DCI. The plurality of same PDSCHs may be considered as a same PDSCH, and may be counted as 1 in the DAI. Therefore, in this case, the counter DAI may be considered to indicate a sequence number of a currently sent PDCCH, and the total DAI may be considered to indicate a total quantity of currently sent PDCCHs. Whether there is a lost PDCCH may be determined based on the total quantity of PDCCHs that is indicated in the total DAI and the total quantity of received PDCCHs. Optionally, the method 200 further includes: The terminal device determines a location of each PDSCH in corresponding HARQ-ACK information. Correspondingly, the network device determines a location of each PDSCH in corresponding HARQ-ACK information.

As described above, the DAI (more specifically, the counter DAI) in each DCI may be used to determine the location of the feedback information of the PDSCH scheduled by using the DAI in the HARQ-ACK information. In this embodiment, in a DCI group used to schedule each PDSCH group, a DAI in each DCI may also be used to determine a location of feedback information of a scheduled PDSCH in HARQ-ACK information. The foregoing has described in detail how to determine feedback information belonging to which PDSCH may be placed in a same piece of HARQ-ACK information. Herein, a location of the feedback information of each PDSCH in the PDSCH group in the corresponding HARQ-ACK information may be further determined by using each DAI in the corresponding DCI group.

The terminal device may determine the location of the feedback information of each PDSCH in the HARQ-ACK information and the length of each piece of HARQ-ACK information based on the foregoing method, to generate the HARQ-ACK information.

In step 240, the terminal device sends the at least two pieces of HARQ-ACK information.

In this embodiment, the terminal device may send the at least two pieces of HARQ-ACK information to a same network device, for example, the first network device or the second network device. The network device may further forward the at least two pieces of HARQ-ACK information to another network device through a backhaul link, or forward HARQ-ACK information of a PDSCH group scheduled by another network device to a third network device.

Alternatively, the terminal device may separately send corresponding HARQ-ACK information to each network device. For example, assuming that the first network device schedules a first PDSCH group, and the second network device schedules a second PDSCH group, the at least two pieces of HARQ-ACK information includes first HARQ-ACK information corresponding to the first PDSCH group and second HARQ-ACK information corresponding to the second PDSCH group. The first HARQ-ACK information may include feedback information for each PDSCH in the first PDSCH group. The second HARQ-ACK information may include feedback information for each PDSCH in the second PDSCH group. The terminal device may send the first HARQ-ACK information to the first network device based on the first PDSCH group, and may send the second HARQ-ACK information to the second network device based on the second PDSCH group.

Optionally, step 240 specifically includes the following two steps: Step 2401. The first network device receives first HARQ-ACK information. Step 2402: The second network device receives second HARQ-ACK information. It should be understood that a correspondence between each network devices and HARQ-ACK information is merely an example for ease of understanding, and should not constitute any limitation on this application.

Optionally, before step 240, the method 200 further includes: The terminal device determines an uplink resource used to transmit the at least two pieces of HARQ-ACK information.

As described above, when scheduling a PDSCH by using a PDCCH, each network device may indicate, by using DCI, an uplink resource used to transmit feedback information for the PDSCH. In this embodiment, when receiving a plurality of PDSCHs, the terminal device may determine, based on last DCI in DCI corresponding to a same PDSCH group, an uplink resource of HARQ-ACK information corresponding to the PDSCH group.

Similar to a PDSCH, DCI used to schedule a same PDSCH group may be referred to as a DCI group, and each DCI group may include one or more DCIs. In other words, PDCCHs used to schedule a same PDSCH group may be referred to as one PDCCH group, and each PDCCH group may include one or more PDCCHs.

When a DCI group includes a plurality of pieces of DCI, the plurality of pieces of DCI in the DCI group may have one or more same attributes of (a), (b), or (c) listed above. For example, when a plurality of pieces of DCI in a same DCI group have the attribute (a), antenna ports indicated by the plurality of pieces of DCI in the same DCI group belong to a same port group. When a plurality of pieces of DCI in a same DCI group have the attribute (b), identifiers of enabled TBs indicated by the plurality of pieces of DCI in the same DCI group are the same. When a plurality of pieces of DCI in a same DCI group have the attribute (c), the plurality of pieces of DCI in the same DCI group or a plurality of PDCCHs in a same PDCCH group are blindly detected based on a same PDCCH configuration.

The terminal device may determine, based on last received DCI in each DCI group, an uplink resource used to transmit HARQ-ACK information of a corresponding PDSCH group. That is, at least two pieces of HARQ-ACK information correspond to at least two PDSCH groups, and at least two PDSCH groups correspond to at least two DCI groups.

Specifically, the at least two DCI groups include a first DCI group and a second DCI group, the first DCI group is used to schedule a first PDSCH group, and the second DCI group is used to schedule a second PDSCH group. The terminal device may determine, based on last received DCI in the first DCI group, an uplink resource used to transmit first HARQ-ACK information, and the uplink resource is denoted as, for example, a first uplink resource. The terminal device may determine, based on last received DCI in the second DCI group, an uplink resource used to transmit second HARQ-ACK information, and the uplink resource is denoted as, for example, a second uplink resource.

Correspondingly, the method 200 further includes: The network device determines an uplink resource for receiving the HARQ-ACK information. Specifically, that the network device determines an uplink resource for receiving the HARQ-ACK information may include: The first network device determines a first uplink resource for receiving first HARQ-ACK information, and the second network device determines a second uplink resource for receiving second HARQ-ACK information.

When scheduling the PDSCH for the terminal device, the network device predetermines the uplink resource used by the terminal device to transmit the HARQ-ACK information. Therefore, the first network device may learn of the first uplink resource for receiving the first HARQ-ACK information, and the second network device may also learn of the second uplink resource for receiving the second HARQ-ACK information.

Referring to FIG. 3, the first PDSCH group and the second PDSCH group may be transmitted on a downlink resource before the $i^{th}$ uplink resource, for example, but not limited to, the $i^{th}$ downlink resource shown in the figure. The first HARQ-ACK information and the second HARQ-ACK information may be transmitted on the $i^{th}$ uplink resource.

Optionally, the first HARQ-ACK information and the second HARQ-ACK information may be carried in different uplink control information (uplink control information, UCI). For example, the first HARQ-ACK information may be carried in first UCI, and the second HARQ-ACK information may be carried in second UCI. Different UCI may be transmitted on different physical uplink control channels (physical uplink control channel, PUCCH). For example, the first UCI is transmitted on a first PUCCH, and the second UCI is transmitted on a second PUCCH.

Optionally, the first uplink resource and the second uplink resource are in a same time unit.

In other words, the terminal device may send the first HARQ-ACK information and the second HARQ-ACK information in a same time unit. In other words, the first PUCCH and the second PUCCH may be in a same time unit. The time unit may be a slot, a subframe, a radio frame, a mini slot, a plurality of aggregated slots, a plurality of aggregated subframes, or the like. This is not limited in this application.

In an NR protocol, the first uplink resource and the second uplink resource may occupy a same slot.

In addition, the first uplink resource and the second uplink resource may occupy a same symbol or different symbols in a same time unit. For example, the first uplink resource and the second uplink resource may occupy a same symbol or different symbols in a same slot.

Further, the first uplink resource and the second uplink resource occupy different symbols in a same time unit.

Distances between the first network device and the second network device that serve a same terminal device and the terminal device may be different. The terminal device needs to ensure that receive power of a signal arriving at each network device meets a preset threshold. Therefore, the terminal device may send HARQ-ACK information to a relatively distant network device by using relatively large transmit power, and send HARQ-ACK information to a relatively close network device by using relatively small transmit power. Independent power control may be performed on transmission of different HARQ-ACK information in a time division manner. Therefore, to ensure that the first HARQ-ACK information and the second HARQ-ACK information are transmitted by using different transmit power, the first uplink resource and the second uplink resource may be configured on different symbols in a same time unit. In other words, the first PUCCH and the second PUCCH may be located on different symbols in a same time unit.

Further, the first uplink resource and the second uplink resource occupy different symbols in a same time unit.

After determining the uplink resources used to transmit the at least two pieces of HARQ-ACK information, the terminal device may transmit the at least two pieces of HARQ-ACK information on the corresponding resources. After determining the uplink resource for receiving the HARQ-ACK information, each network device may also separately receive the HARQ-ACK information on the corresponding resource.

Optionally, the method 200 further includes: The network device determines a length of each piece of HARQ-ACK information.

Specifically, that the network device determines a length of each piece of HARQ-ACK information may include: The first network device determines a length of received first HARQ-ACK information, and the second network device determines a length of received second HARQ-ACK information.

Because the network device may learn in advance of a quantity of PDSCHs scheduled by the network device, the length of the HARQ-ACK information may be predetermined. Therefore, the first network device may demodulate and decode the first HARQ-ACK information based on the length of the first HARQ-ACK information, and the second network device may demodulate and decode the second HARQ-ACK information based on the length of the second HARQ-ACK information.

A process in which the network device demodulates and decodes the HARQ-ACK information after receiving the HARQ-ACK information may be the same as that in the current technology. For brevity, detailed descriptions of a specific process are omitted herein.

Optionally, the method 200 further includes: The network device determines a location of feedback information of a scheduled PDSCH in corresponding HARQ-ACK information based on each PDCCH.

Specifically, the network device may predetermine the location of the feedback information of the scheduled PDSCH in the corresponding HARQ-ACK information. For example, the location may be determined based on a sequential order of scheduled PDSCHs in time domain, or may be determined based on other information. This is not limited in this application. Actually, the network device may determine, based on the determined location of the feedback information of each PDSCH in the corresponding HARQ-ACK information, the counter DAI in the DCI used to schedule each PDSCH.

In this embodiment, that the network device determines a location of feedback information of a scheduled PDSCH in corresponding HARQ-ACK information based on each PDCCH may specifically include: The first network device determines a location of each PDSCH in a first PDSCH group in the first HARQ-ACK information, and the second network device determines a location of each PDSCH in the second PDSCH group in the second HARQ-ACK information.

In step 250, the network device determines, based on the HARQ-ACK information, a PDSCH that needs to be retransmitted.

In this embodiment, step 250 may specifically include the following two steps: Step 2501: The first network device determines, based on at least one piece of HARQ-ACK information, a PDSCH that needs to be retransmitted. Step 2502: The second network device determines, based on at least one piece of HARQ-ACK information, a PDSCH that needs to be retransmitted.

As described above, the HARQ-ACK information received by the first network device may include but is not limited to first HARQ-ACK information, and the HARQ-ACK information received by the second network device may include but is not limited to second HARQ-ACK information. Each network device may determine, based on an ACK or a NACK fed back for each PDSCH in the HARQ-ACK information, which PDSCHs need to be retransmitted and which PDSCHs do not need to be retransmitted, and then perform corresponding processing.

Optionally, the method 200 further includes: The network device determines a location of feedback information of each PDSCH in corresponding HARQ-ACK information.

As described above, the DAI (more specifically, the counter DAI) in each DCI may be used to determine the location of the feedback information of the PDSCH scheduled by using the DAI in the HARQ-ACK information. In this embodiment, in a DCI group used to schedule each PDSCH group, a DAI in each DCI may also be used to determine a location of feedback information of a scheduled PDSCH in HARQ-ACK information. The foregoing has described in detail how to determine feedback information belonging to which PDSCH may be placed in a same piece of HARQ-ACK information. Herein, the network device may further determine a location of the feedback information of each PDSCH in the PDSCH group in the corresponding HARQ-ACK information by using each DAI in the corresponding DCI group. Then, the received HARQ-ACK information may be parsed based on the location of the feedback information of each PDSCH in the HARQ-ACK information, to further determine which PDSCHs are successfully received and successfully decoded, and which PDSCHs are not successfully received or not successfully decoded.

Based on the foregoing technical solution, the terminal device may determine, based on at least one of the DMRS port group, the identifier of the enabled TB, and the PDCCH configuration, which PDSCHs may be received from a same network device, so that the terminal device can determine which PDSCHs may feed back an ACK or a NACK by using a same piece of HARQ-ACK information. Therefore, it is possible to avoid incorrect feedback that may be caused by placing feedback information of PDSCHs from different network devices in a same piece of HARQ-ACK information, and receiving and decoding statuses of PDSCHs can be accurately fed back in a case of multi-site scheduling. The network device may determine, based on feedback information for each PDSCH, which PDSCHs need to be retransmitted and which PDSCHs do not need to be retransmitted, thereby helping improve data transmission performance and improve user experience.

It should be understood that the first network device and the second network device listed above are shown only for ease of understanding, and the foregoing plurality of PDSCHs are not limited to being from the first network device and the second network device. In addition, the figure is merely an example, and shows steps in which the first network device and the second network device each send a PDCCH and a PDSCH to the terminal device, and steps in which the first network device and the second network device each receive HARQ-ACK information. However, this should not constitute any limitation on this application. The terminal device may alternatively be connected to more network devices, or may send a plurality of pieces of HARQ-ACK information to a same network device.

The foregoing describes in detail the method for sending HARQ-ACK information and the method for receiving HARQ-ACK information provided in the embodiments of this application with reference to FIG. 2 and FIG. 3. The following describes in detail a communications apparatus in the embodiments of this application with reference to FIG. 4 to FIG. 6.

Figure 4:
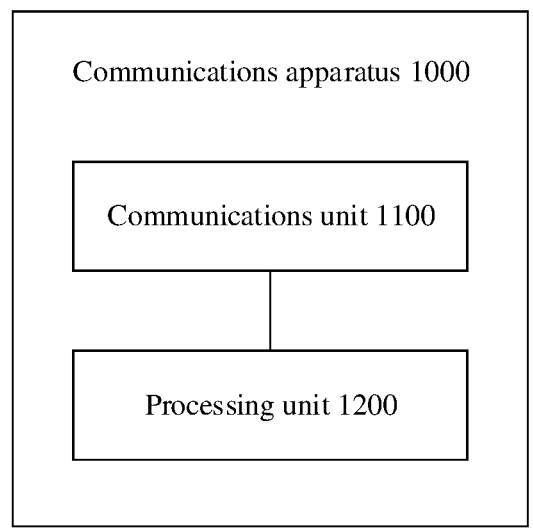
FIG. 4 is a schematic block diagram of a communications apparatus according to an embodiment of this application.

FIG. 4 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments, for example, may be the terminal device, or a chip disposed in the terminal device.

Specifically, the communications apparatus 1000 may correspond to the terminal device in the method 200 according to the embodiments of this application. The communications apparatus 1000 may include units configured to perform the method performed by the terminal device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the communications unit 1100 may be configured to perform step 220 to step S240 in the method 200, and the processing unit 1200 may be configured to perform step 210 in the method 200.

It should be understood that a specific process in which each unit performs the foregoing corresponding steps is described in detail in the foregoing method embodiments. For brevity, details are not described herein again.

Figure 5:
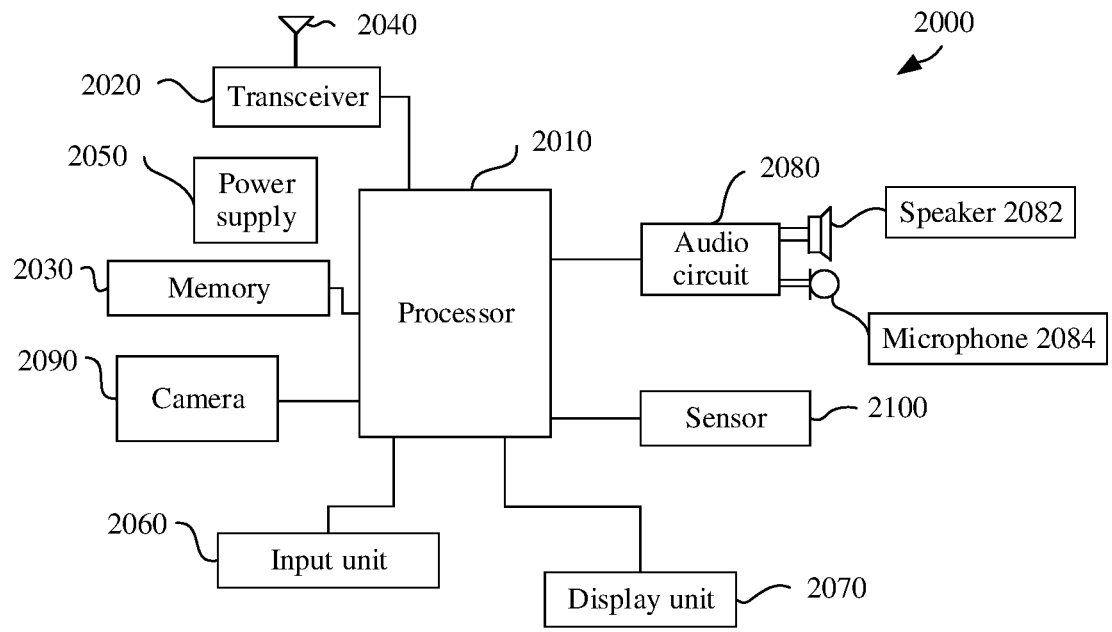
FIG. 5 is a schematic structural diagram of a terminal device according to an embodiment of this application.

It should be further understood that when the communications apparatus 1000 is a terminal device, the communications unit 1100 in the communications apparatus 1000 may correspond to a transceiver 2020 in a terminal device 2000 shown in FIG. 5, and the processing unit 1200 in the communications apparatus 1000 may correspond to a processor 2010 in the terminal device 2000 shown in FIG. 5.

It should be further understood that when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments, for example, may be the network device, or a chip disposed in the network device.

In another possible design, the communications apparatus 500 may correspond to the network device in the foregoing method embodiments, for example, may be the network device, or a chip disposed in the network device.

Specifically, the communications apparatus 1000 may correspond to the network device in the method 200 according to the embodiments of this application. The communications apparatus 1000 may include units configured to perform the method performed by the network device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the communications unit 1100 may be configured to perform step 2201, step 2301, and step 2401 in the method 200, and the processing unit 1200 may be configured to perform step 2501 in the method 200. Alternatively, the communications unit 1100 may be configured to perform step 2202, step 2302, and step 2402 in the method 200, and the processing unit 1200 may be configured to perform step 2502 in the method 200.

Figure 6:
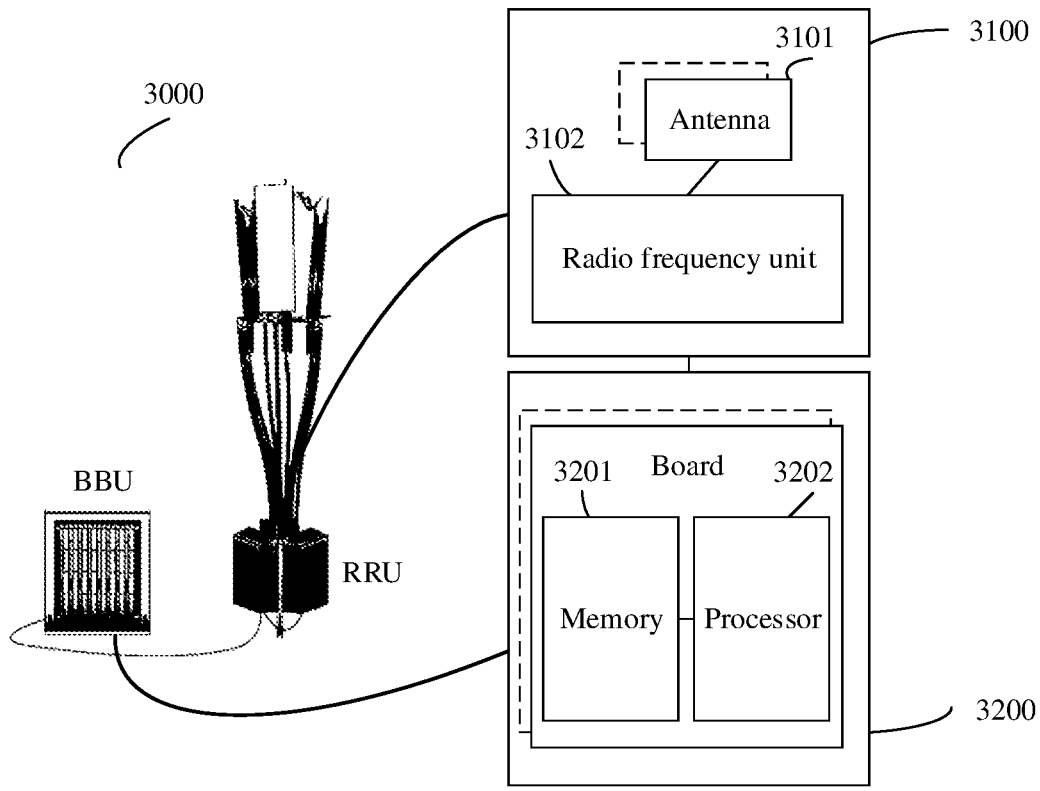
FIG. 6 is a schematic structural diagram of a network device according to an embodiment of this application.

It should be further understood that when the communications apparatus 1000 is a network device, the communications unit in the communications apparatus 1000 may correspond to a transceiver 3100 in a network device 3000 shown in FIG. 6, and the processing unit 1200 in the communications apparatus 1000 may correspond to a processor 3200 in the network device 3000 shown in FIG. 6.

It should be further understood that when the communications apparatus 1000 is a chip disposed in a network device, the communications unit 1100 in the communications apparatus 1000 may be an input/output interface.

FIG. 5 is a schematic structural diagram of the terminal device 2000 according to an embodiment of this application. The terminal device 2000 may be applied to the system shown in FIG. 1, and performs functions of the terminal device in the foregoing method embodiments.

As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send or receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 4.

The transceiver 2020 may correspond to the communications unit in FIG. 4, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 5 can implement each process of the terminal device in the method embodiment in FIG. 2. The operations and/or the functions of the modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 6 is a schematic structural diagram of a network device according to an embodiment of this application, for example, may be a schematic structural diagram of a base station. The base station 3000 may be applied to the system shown in FIG. 1, and performs functions of the network device in the foregoing method embodiments.

As shown in the figure, the base station 3000 may include one or more radio frequency units, such as a remote radio unit (RRU) 3100 and one or more baseband units (BBU) (which may also be referred to as digital units (DU)) 3200. The RRU 3100 may be referred to as a transceiver unit, and corresponds to the communications unit 1200 in FIG. 4. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to: receive and send a radio frequency signal, and perform conversion between a radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately, to be specific, the base station is a distributed base station.

The BBU 3200 is a control center of the base station, may also be referred to as a processing unit. The BBU may correspond to the processing unit 1100 in FIG. 4, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, generate the foregoing indication information.

In an example, the BBU 3200 may include one or more boards, and a plurality of boards may jointly support a radio access network (for example, an LTE network) of a single access standard, or may separately support radio access networks (for example, an LTE network, a 5G network, or another network) of different access standards. The BBU 3200 further includes a memory 3201 and a processor 3202. The memory 3201 is configured to store a necessary instruction and necessary data. The processor 3202 is configured to control the base station to perform a necessary action, for example, is configured to control the base station to perform an operation procedure related to the network device in the foregoing method embodiments. The memory 3201 and the processor 3202 may serve one or more boards. In other words, each board may be independently disposed with a memory and a processor. Alternatively, a plurality of boards may share a same memory and a same processor. In addition, each board may further disposed with a necessary circuit.

It should be understood that the base station 3000 shown in FIG. 6 can implement each process of the network device in the method embodiment in FIG. 2. The operations and/or the functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the communication method in the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a microcontroller (MCU), a programmable controller (programmable logic device, PLD), or another integrated chip.

In an implementation process, steps in the foregoing methods can be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be noted that the processor in the embodiments of this application may be an integrated circuit chip, and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (synchlink DRAM, SLDRAM), and a direct rambus random access memory (DR RAM). It should be noted that the memory of the systems and methods described in this specification includes but is not limited to these and any memory of another appropriate type.

Based on the methods provided in the embodiments of this application, this application further provides a computer program product. The computer program product includes computer program code. When the computer program code is run on a computer, the computer is enabled to perform the method in any one of the embodiments shown in FIG. 2.

According to the methods provided in the embodiments of this application, this application further provides a computer-readable medium. The computer-readable medium stores program code. When the program code is run on a computer, the computer is enabled to perform the method in any one of the embodiments shown in FIG. 2.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments exactly correspond to the network device and the terminal device in the method embodiments. A corresponding module or unit performs a corresponding step. For example, a communications unit (a transceiver) performs a receiving step or a sending step in the method embodiments, and a processing unit (a processor) may perform another step other than the sending step and the receiving step. For a function of a specific unit, refer to the corresponding method embodiments. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that illustrative logical blocks and steps described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending hybrid automatic repeat request (HARQ)-acknowledgment LACK information, comprising:
   receiving a first plurality of physical downlink shared channels (PDSCHs) in a time period;
   grouping the first plurality of PDSCHs into at least two groups of PDSCHs, based on port groups to which ports of demodulation reference signals (DMRSs) used to demodulate the first plurality of PDSCHs belong, identifiers of enabled transport blocks (TBs) carried in the first plurality of PDSCHs, or physical downlink control channel (PDCCH) configurations of a plurality of PDCCHs used to schedule the first plurality of PDSCHs;
   generating at least two pieces of HARQ-ACK information for the at least two groups of PDSCHs, wherein each piece of HARQ-ACK information comprises an acknowledgment (ACK) or a negative acknowledgment (NACK) fed back for one or more PDSCHs in a corresponding group; and
   sending the at least two pieces of HARQ-ACK information.

2. The method according to claim 1, wherein transmission resources of the at least two pieces of HARQ-ACK information occupy a same time unit in time domain.

3. The method according to claim 2, wherein the transmission resources of the at least two pieces of HARQ-ACK information occupy different symbols in the same time unit.

4. The method according to claim 1, wherein the first plurality of physical downlink shared channels (PDSCHs) are received from a plurality of network devices.

5. The method according to claim 4, wherein the plurality of PDSCHs are respectively scheduled by the plurality of network devices by using respective PDCCHs.

6. The method according to claim 1, wherein in each of the at least two groups of PDSCHs at least one of the following is the same for all PDSCHs in the respective group: port groups to which ports of demodulation reference signals (DMRSs) used to demodulate the PDSCHs in the respective group belong, identifiers of enabled transport blocks (TBs) carried in the PDSCHs in the respective group, or PDCCH configurations of PDCCHs used to schedule the PDSCHs in the respective group.

7. A method, comprising:
   receiving, by a terminal, one or more first physical downlink shared channels (PDSCHs) in a time period from a first network device;
   receiving, by the terminal, one or more second PDSCHs in the time period from a second network device;
   grouping, by the terminal, the one or more first PDSCHs and the one or more second PDSCHs into at least two groups of PDSCHs, based on port groups to which ports of demodulation reference signals (DMRSs) used to demodulate the one or more first PDSCHs and the one or more second PDSCHs belong, identifiers of enabled transport blocks (TBs) carried in the one or more first PDSCHs and the one or more second PDSCHs, or physical downlink control channel (PDCCH) configurations of a plurality of PDCCHs used to schedule the one or more first PDSCHs and the one or more second PDSCHs;
   generating, by the terminal, at least two pieces of HARQ-ACK information for the at least two groups of PDSCHs;
   receiving, by the first network device, one or more pieces of HARQ-ACK information of the at least two pieces of HARQ-ACK information, wherein each piece of HARQ-ACK information of the one or more pieces of HARQ-ACK information comprises an acknowledgment (ACK) or a negative acknowledgment (NACK) fed back for a corresponding one or more physical downlink shared channels (PDSCHs); and
   determining, based on the one or more pieces of HARQ-ACK information, information that needs to be retransmitted, and retransmitting the information that needs to be retransmitted.

8. The method according to claim 7, wherein transmission resources of the at least two pieces of HARQ-ACK information occupy a same time unit in time domain.

9. The method according to claim 8, wherein the transmission resources of the at least two pieces of HARQ-ACK information occupy different symbols in the same time unit.

10. A communications apparatus, comprising:
    a memory, configured to store a computer program;
    a processor, configured to execute the computer program stored in the memory to perform following steps:
      receiving a first plurality of physical downlink shared channels (PDSCHs) in a time period;
      grouping the first plurality of PDSCHs into at least two groups of PDSCHs, based on port groups to which ports of demodulation reference signals (DMRSs) used to demodulate the first plurality of PDSCHs belong, identifiers of enabled transport blocks (TBs) carried in the first plurality of PDSCHs, or physical downlink control channel (PDCCH) configurations of a plurality of PDCCHs used to schedule the first plurality of PDSCHs;
      generating at least two pieces of HARQ-ACK information, wherein each piece of HARQ-ACK information comprises an acknowledgment (ACK) or a negative acknowledgment (NACK) fed back for one or more PDSCHs in a corresponding group; and
      sending the at least two pieces of HARQ-ACK information.

11. The apparatus according to claim 10, wherein transmission resources of the at least two pieces of HARQ-ACK information occupy a same time unit in time domain.

12. The apparatus according to claim 11, wherein the transmission resources of the at least two pieces of HARQ-ACK information occupy different symbols in the same time unit.

13. The apparatus according to claim 10, wherein the first plurality of physical downlink shared channels (PDSCHs) are received from a plurality of network devices.

14. The apparatus according to claim 13, wherein the plurality of PDSCHs are respectively scheduled by the plurality of network devices by using respective PDCCHs.

15. The apparatus according to claim 10, wherein the first plurality of PDSCHs are grouped into the at least two groups of PDSCHs based on port groups to which ports of demodulation reference signals (DMRSs) used to demodulate the first plurality of PDSCHs belong.

16. The apparatus according to claim 10, wherein the first plurality of PDSCHs are grouped into the at least two groups of PDSCHs based on identifiers of enabled transport blocks (TBs) carried in the first plurality of PDSCHs.

17. The apparatus according to claim 10, wherein the first plurality of PDSCHs are grouped into the at least two groups of PDSCHs based on the PDCCH configurations of the plurality of PDCCHs used to schedule the first plurality of PDSCHs.

18. A system, comprising:
a terminal device;
a first network device; and
a second network device;
wherein the terminal device is configured to:
    receive one or more first physical downlink shared channels (PDSCHs) in a time period from the first network device;
    receive one or more second PDSCHs in the time period from the second network device;
    group the one or more first PDSCHs and the one or more second PDSCHs into at least two groups of PDSCHs, based on port groups to which ports of demodulation reference signals (DMRSs) used to demodulate the one or more first PDSCHs and the one or more second PDSCHs belong, identifiers of enabled transport blocks (TBs) carried in the one or more first PDSCHs and the one or more second PDSCHs, or physical downlink control channel (PDCCH) configurations of a plurality of PDCCHs used to schedule the one or more first PDSCHs and the one or more second PDSCHs; and
    generate at least two pieces of HARQ-ACK information for the at least two groups of PDSCHs; and
wherein the first network device is configured to:
    receive one or more pieces of HARQ-ACK information of the at least two pieces of HARQ-ACK information, wherein each piece of HARQ-ACK information of the one or more pieces of HARQ-ACK information comprises an acknowledgment (ACK) or a negative acknowledgment (NACK) fed back for a corresponding one or more physical downlink shared channels (PDSCHs).

19. The system according to claim 18, wherein transmission resources of the at least two pieces of HARQ-ACK information occupy a same time unit in time domain.

20. The system according to claim 18, wherein transmission resources of the at least two pieces of HARQ-ACK information occupy different symbols in the same time unit.

* * * * *

UNITED STATES PATENT AND TRADEMARK OFFICE
CERTIFICATE OF CORRECTION

| | | |
|---|---|---|
| PATENT NO. | : 12,003,340 B2 | |
| APPLICATION NO. | : 17/189823 | |
| DATED | : June 4, 2024 | |
| INVENTOR(S) | : Ge et al. | |

It is certified that error appears in the above-identified patent and that said Letters Patent is hereby corrected as shown below:

In the Claims

In Column 43, in Claim 1, Line 27, delete "LACK" and insert -- (ACK) --.

Signed and Sealed this
Ninth Day of July, 2024

Katherine Kelly Vidal
*Director of the United States Patent and Trademark Office*